US012434197B1

(12) United States Patent
Qasem

(10) Patent No.: US 12,434,197 B1
(45) Date of Patent: *Oct. 7, 2025

(54) COMMON HOUSING VAPOR ABSORPTION REFRIGERATION SYSTEM

(71) Applicant: KING FAHD UNIVERSITY OF PETROLEUM AND MINERALS, Dhahran (SA)

(72) Inventor: Naef A.A. Qasem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,806

(22) Filed: Jun. 20, 2025

Related U.S. Application Data

(63) Continuation of application No. 18/163,944, filed on Feb. 3, 2023.

(51) Int. Cl.
*F25B 15/00* (2006.01)
*B01D 61/36* (2006.01)
(Continued)

(52) U.S. Cl.
CPC ......... *B01D 61/368* (2013.01); *B01D 61/364* (2013.01); *B01D 61/366* (2013.01);
(Continued)

(58) Field of Classification Search
CPC ........ B01D 3/36; B01D 3/364; B01D 3/3641; C02F 1/04–20; C02F 1/447
See application file for complete search history.

(56) References Cited

U.S. PATENT DOCUMENTS

| 5,775,126 A | 7/1998 | Sato |
| 8,302,425 B2 | 11/2012 | Yanagi |
(Continued)

FOREIGN PATENT DOCUMENTS

KR    10-2010-0080552 A    7/2010

OTHER PUBLICATIONS

Naef A.A. Qasem, et al., "Innovative integration of a series-module membrane distillation plant with a double-effect absorption refrigerator", Case Studies in Thermal Engineering, vol. 40, Article No. 102498, Dec. 2022, pp. 1-16.
(Continued)

*Primary Examiner* — Jonathan Luke Pilcher
(74) *Attorney, Agent, or Firm* — Oblon, McClelland, Maier & Neustadt, L.L.P.

(57) ABSTRACT

A vapor-absorption refrigeration (VAR) system. The VAR system includes a VAR section having a condenser, an absorber, an evaporator, a first desorber, a second desorber, a first heat exchanger, a second heat exchanger, at least four throttling valves, and at least two pumps. The VAR section heats a saline water feed stream using heat released from the absorber and the condenser, producing cooling effect. The VAR system includes a direct contact membrane distillation-absorber (DCMD-Abs) section receiving the hot saline water feed stream. The DCMD-Abs section comprises DCMD-Abs modules linked in series. Each DCMD-Abs module includes a saltwater feed compartment and a water compartment, and a membrane. Due to temperature difference between the saline water feed stream and cooling water stream, water vapors are produced by evaporation in the saltwater feed compartment and passes through the membrane to the water compartment to be condensed therein.

18 Claims, 14 Drawing Sheets

(51) Int. Cl.
*C02F 1/44* (2023.01)
*F25B 15/06* (2006.01)
*C02F 103/08* (2006.01)

(52) U.S. Cl.
CPC .............. *C02F 1/447* (2013.01); *F25B 15/00* (2013.01); *F25B 15/06* (2013.01); *C02F 2103/08* (2013.01)

(56) References Cited

U.S. PATENT DOCUMENTS

| | | |
|---|---|---|
| 8,603,223 B2 | 12/2013 | Saha |
| 9,409,129 B2 | 8/2016 | Duke |
| 10,150,681 B2 | 12/2018 | Yuh |
| 10,532,936 B2 | 1/2020 | Al-Azazmeh et al. |
| 10,596,521 B2 | 3/2020 | Khalifa |
| 10,926,223 B2 | 2/2021 | Al-Amri |
| 11,035,581 B1 | 6/2021 | Abdulrahim |
| 11,142,468 B2 | 10/2021 | Qasem |
| 11,333,412 B2 | 5/2022 | Muthusubramanian |
| 11,712,661 B2 | 8/2023 | Khalifa |
| 11,761,644 B1 | 9/2023 | Qasem |
| 11,802,058 B2 | 10/2023 | Huang |
| 2011/0048920 A1 | 3/2011 | Avery |
| 2013/0341177 A1 | 12/2013 | Ng |
| 2017/0072336 A1 | 3/2017 | Ng |
| 2017/0284707 A1 | 10/2017 | Brenner et al. |
| 2024/0262715 A1 | 8/2024 | Qasem |
| 2024/0343616 A1 | 10/2024 | Alazab |

OTHER PUBLICATIONS

Jonathan Ibarra-Bahena, et al., "Role of Membrane Technology in Absorption Heat Pumps: A Comprehensive Review", Membranes, vol. 10, No. 9:216, Aug. 31, 2020, pp. 1-28.

COMMON HOUSING VAPOR ABSORPTION REFRIGERATION SYSTEM

CROSS-REFERENCE TO RELATED APPLICATIONS

The present application is a Continuation of U.S. application Ser. No. 18/163,944, now allowed, having a filing date of Feb. 3, 2023.

STATEMENT REGARDING PRIOR DISCLOSURE BY AN INVENTOR

Aspects of the present disclosure are described in Qasem, et. al., "Innovative integration of a series-module membrane distillation plant with a double-effect absorption refrigerator" published in Case Studies in Thermal Engineering, on Jul. 29, 2022, which is incorporated by reference herein in its entirety.

STATEMENT OF ACKNOWLEDGEMENT

The inventor acknowledges the support provided by the King Fahd University of Petroleum & Minerals (KFUPM), Riyadh, Saudi Arabia through Project INMW2104.

BACKGROUND

Technical Field

The present disclosure is directed to an integrated cooling and desalination system, and more particularly to powering of a direct-contact membrane distillation (DCMD) plant by heat released from a double-effect vapor-absorption refrigerator (VAR).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Freshwater and comfortable indoor conditions are two major global requirements and are more important in hot and arid regions. The increasing demand for potable water and cooling/refrigeration is increasing as the world's population grows [See: Qasem N A A, Zubair S M, Abdallah A M, Elbassoussi M H, Ahmed M A. Novel and efficient integration of a humidification-dehumidification desalination system with an absorption refrigeration system. Appl Energy 2020; 263:114659. Desalination methods are practical solutions used to meet potable water requirements. Reverse osmosis, electrodialysis, and multi-effect desalination are examples of commercial desalination technologies that have been utilized to produce freshwater. Regarding cooling requirements, different refrigeration systems have been proposed, including vapor-compression refrigeration (VCR) systems, vapor-absorption refrigeration (VAR) systems, and vapor-adsorption (VAD) systems. Each of these refrigeration systems has its advantages and disadvantages. For instance, VCR systems have a higher coefficient of performance (COP) whereas VAR systems may be driven by thermal energy sources and use environmentally friendly refrigerants (e.g., lithium bromide). It may be noted that each of these refrigeration systems generates thermal energy, which is usually expelled into the atmosphere as waste heat.

Desalination technologies have four mean types, thermal-based, such as multi-effect desalination [See: Xue Y, Ge Z, Yang L, Du X. Peak shaving performance of coal-fired power generating unit integrated with multi-effect distillation seawater desalination. Appl Energy 2019:175-84; Thu K, Kim Y-D, Shahzad M W, Saththasivam J, Ng K C. Performance investigation of an advanced multi-effect adsorption desalination (MEAD) cycle. Appl Energy 2015; 159:469-77]; humidification-dehumidification (HDH) [See: McGovern R K, Thiel G P, Prakash Narayan G, Zubair S M, Lienhard V J H. Performance limits of zero and single extraction humidification-dehumidification desalination systems. Appl Energy 2013; 102:1081-90, Qasem N, Imteyaz B, Antar M A. Investigation of the effect of the top and the bottom temperatures on the performance of humidification dehumidification desalination systems. ASME Int. Mech. Eng. Congr. Expo. Proc., vol. 6A-2016, 2016]; membrane-based, such as electrodialysis [See: Qasem N A A, Qureshi B A, Zubair S M. Improvement in design of electrodialysis desalination plants by considering the Donnan potential. Desalination 2018; 441]; and reverse osmosis (RO) [See: Kim J, Park K, Yang D R, Hong S. A comprehensive review of energy consumption of seawater reverse osmosis desalination plants. Appl Energy 2019; 254:113652].

Membrane desalination (MD) is a promising technology due to its ability to utilize low-temperature and low-heat sources [See: Ullah R, Khraisheh M, Esteves R J, McLeskey J T, AlGhouti M, Gad-el-Hak M, et al. Energy efficiency of direct contact membrane distillation. Desalination 2018; 433:56-67]. MD systems can use solar thermal, geothermal, and waste heat making it a cost-effective technique. MD systems are also competitive with RO systems due to their low energy requirements and capability to handle high-temperature conditions where RO is not favored. Direct contact MD (DCMD) is a thermally driven process that may run at temperatures beyond 100° C., making it an energy-efficient technology for local freshwater desalination [See: Thiel G P, Tow E W, Banchik L D, Chung H W, Lienhard V J H. Energy consumption in desalinating produced water from shale oil and gas extraction. Desalination 2015].

For cooling/refrigeration, as discussed, vapor-compression refrigerators (VCR) [See: Ayati E, Rahimi-Ahar Z, Hatamipour M S, Ghalavand Y. Performance evaluation of a heat pump-driven vacuum humidification-dehumidification desalination system. Appl Therm Eng 2020; 180: 115872]; vapor-absorption refrigeration (VAR) [See: Qasem N A A. Waste-heat recovery from a vapor-absorption refrigeration system for a desalination plant. Appl Therm Eng 2021; 195:117199]; and vapor-adsorption (VAD) systems [See: Qasem N A A, Zubair S M. Performance evaluation of a novel hybrid humidification-dehumidification (air-heated) system with an adsorption desalination system. Desalination 2019; 461:37-54], are the three types of refrigeration systems.

Despite the fact that the VCR technologies produced more cooling than other techniques, the VCR systems are driven by electricity. VCR has been studied using various methods, including, HDH technologies [See: Lawal D, Antar M, Khalifa A, Zubair S, Al-Sulaiman F. Humidification-dehumidification desalination system operated by a heat pump. Energy Convers Manag 2018; 161:128-40], and MD technologies [See: Khalifa A, Mezghani A, Alawami H. Analysis of integrated membrane distillation-heat pump system for water desalination. Desalination 2021; 510:115087]. The VAR system is powered by thermal energy and employs environmentally-friendly coolants such as lithium bromide (LiBr). The VAR system also generates waste energy from both a condenser and an absorber, making such systems an excellent choice for powering other thermal systems, such as desalination systems. However, there hasn't been much investigation into using VAR to control desalination plants. VAR systems were combined with HDH systems [See: Boman D B, Garimella S. Performance improvement of a water-purifying absorption cooler through humidification-dehumidification. Appl Therm Eng 2021; 185:116327] and studied for their performance output. VAD systems, however, were less popular, and have been utilized in conjunction with HDH systems and multi-effect desalination (MED) facilities [See: Saren S, Mitra S, Miyazaki T, Ng K C, Thu K. A novel hybrid adsorption heat transformer-multi-effect distillation (AHT-MED) system for improved performance and waste heat upgrade. Appl Energy 2022; 305:117744].

Thus, water desalination and air cooling consume a significant amount of energy contributing to rising global warming. Integrating desalination and cooling systems can improve the overall energy utilization factor (EUF) [See: Chiranjeevi C, Srinivas T. Combined two stage desalination and cooling plant. Desalination 2014; 345:56-63; Shafieian A, Khiadani M. A multipurpose desalination, cooling, and air-conditioning system powered by waste heat recovery from diesel exhaust fumes and cooling water. Case Stud Therm Eng 2020; 21:100702], and provide a range of diverse outputs, such as power, cooling, and desalination [See: Mohammadi K, Khaledi M S E, Saghafifar M, Powell K. Hybrid systems based on gas turbine combined cycle for trigeneration of power, cooling, and freshwater: A comparative techno-economic assessment. Sustain Energy Technol Assessments 2020].

Shaulsky et al. [See: Shaulsky E, Wang Z, Deshmukh A, Karanikola V, Elimelech M. Membrane distillation assisted by heat pump for improved desalination energy efficiency. Desalination 2020; 496:114694] provided a theoretical analysis of a combined DCMD-heat pump system. Such a combined DCMD-heat pump system was compared to the VCR system, and DCMD was integrated with a heat exchanger. The authors considered a gained output ratio (GOR) as a performance metric. In comparison to the DCMD with heat exchangers, their findings revealed that including a heat pump improved energy efficiency. Another study utilized the heat discharged by a VCR system's condenser to heat a DCMD system's feed compartment, whereas the cooling effect of the VCR system was employed to cool the cold chamber. A GOR of 1.8-2.1 was achieved at $0.5-$30 per m$^3$ of water cost.

Also, a VCR system and an air gap MD system were combined together in order to achieve a sulfuric acid solution concentration [See: Yue C, Peng Y, Chen L, Schaefer L A. Thermal analysis of a heat pump-based liquid gap membrane distillation H2SO4 system. Chem Eng Process—Process Intensif 2021; 167:108509]. In addition, a VCR system was integrated with a vacuum MD for the treatment of sulfuric acid solutions [See: Si Z, Xiang J, Han D. Performance analysis of a vacuum membrane distillation system coupled with heat pump for sulfuric acid solution treatment. Chem Eng Process—Process Intensif 2022; 171: 108734]. At a charge of $15.56 per ton of refrigeration, the cooling capacity (primary product) was estimated to have a coefficient of performance (COP) of 3.44 (TR). A VCR system coupled with two-module air-gap MD was used to generate freshwater (no cooling effect) at a rate of 2000 L/h while consuming a lot of energy [See: Bindels M, Nelemans B. Theoretical analysis of heat pump assisted air gap membrane distillation. Desalination 2021; 518:115282]. The condensation recovery cost was found to be at 4.11 $/m$^3$ when integrating a sweeping gas MD with a thermoelectric heat pump [See: Tan Y Z, Han L, Chew N G P, Chow W H, Wang R, Chew J W. Membrane distillation hybridized with a thermoelectric heat pump for energy-efficient water treatment and space cooling. Appl Energy 2018; 231:1079-88].

Further, Sadeghi M et al. [See: Sadeghi M, Yari M, Mahmoudi S M S, Jafari M. Thermodynamic analysis and optimization of a novel combined power and ejector refrigeration cycle-Desalination system. Appl Energy 2017; 208: 239-51] disclosed a multi-generation system consisting of an ejector refrigeration cycle (ERC), an HDH desalination unit, and a power production unit. At a total output power of 57 kW and a refrigeration capacity of 91.25 kW, the hybrid system achieved an overall thermal efficiency of 17.12%. With a freshwater production rate of 0.38 kg/s, the system had a GOR of 0.62. Preheating the intake of saltwater to the desalination cycle, on the other hand, improved the GOR of the HDH unit and allowed for further improvement. A double-effect VAR system and an HDH system showed a freshwater production of 1145 L/h and a cooling effect of 62.45 TR.

Some other studies on MD desalination with economic analysis are also present in the literature. Such studies provided useful information on the overall competency technology and the major cost factors [See: Khayet M. Solar desalination by membrane distillation: Dispersion in energy consumption analysis and water production costs (a review). Desalination 2013; Sarbatly R, Chiam C K. Evaluation of geothermal energy in desalination by vacuum membrane distillation. Appl Energy 2013; Al-Obaidani S, Curcio E, Macedonio F, Di Profio G, Al-Hinai H, Drioli E. Potential of membrane distillation in seawater desalination: Thermal efficiency, sensitivity study and cost estimation. J. Memb Sci 2008; Banat F, Jwaied N. Economic evaluation of desalination by small-scale autonomous solar-powered membrane distillation units. Desalination 2008; 220:566-73; Guillén-Burrieza E, Alarcón-Padilla D C, Palenzuela P, Zaragoza G. Techno-economic assessment of a pilot-scale plant for solar desalination based on existing plate and frame MD technology. Desalination 2015; Lee J G, Kim W S. Numerical study on multi-stage vacuum membrane distillation with economic evaluation. Desalination 2014]. For a DCMD technique with and without heat recovery, Al-Obaidani et al. observed pure water prices of $1.17/m$^3$ and $1.25/m$^3$, respectively. The findings indicated over 61% of the operating and maintenance expenditures for the DCMD plant without heat recovery were spent on generating steam for heating purposes. As a result, decreasing or eliminating the required heat might significantly cut total water expenses.

The combination of VAR systems with MD plants for cooling and desalination processes is rarely reported in the open literature. A research study [See: Yassen A, Antar M A, Khalifa A E, El-Shaarawi M. Analysis of Absorption Cooling and MD Desalination Cogeneration System. Arab J Sci Eng 2019; 44:1081-95] integrated a single DCMD and single-effect VAR system without addressing performance metrics, such as water production cost, COP, and GOR. However, the research study [See: Herold K E, Radermacher R, Klein S A. Absorption Chillers and Heat Pumps. 2016], revealed that standalone double-effect VAR systems performed better than single-effect VAR systems.

U.S. Pat. No. 11,333,412B2 discloses a climate-control system that may include a first fluid circuit, a desiccant system, and a second fluid circuit. The first fluid circuit may include a desorber, an absorber, and an evaporator. A first fluid exits the desorber through a first outlet and flows through the evaporator and a first inlet of the absorber. A second fluid exits the desorber through a second outlet and may flow through a second inlet of the absorber. The desiccant system includes a conditioner and a regenerator. The conditioner includes a first desiccant flow path. The regenerator includes a second desiccant flow path in communication with the first desiccant flow path. The second fluid circuit circulates a third fluid that is fluidly isolated from the first and second fluids and desiccant in the desiccant system. The second fluid circuit may be in heat transfer relationships with the first fluid and the first desiccant flow path. However, the system only provides for more efficient cooling and humidity reduction over a narrower range of operating conditions.

Each of the aforementioned references suffers from one or more drawbacks hindering their adoption. In particular, series-multistage membrane distillation (DCMD) plants driven by double-effect vapor-absorption refrigerator (VAR) systems are not conventional. Moreover, powering an DCMD plant by the heat released from an absorber and condenser of a VAR system is no reported.

Accordingly, it is one object of the present disclosure to provide a VAR system that integrates a DCMD plant in such a way that two products (freshwater and cooling effect) are obtained with low energy consumption.

SUMMARY

In an exemplary embodiment, a vapor-absorption refrigeration (VAR) system is provided. The VAR system includes a condenser, an absorber, an evaporator, a first desorber and a second desorber, a first heat exchanger and a second heat exchanger, at least four throttling valves, and at least two pumps. The VAR system further includes a direct contact membrane distillation-absorber (DCMD-Abs) section. The DCMD-Abs section includes a saltwater feed compartment and a water compartment. Herein, the saltwater feed compartment and the water compartment are separated by a membrane. Further, the membrane permits water vapor to pass from the saltwater feed compartment to the water compartment. The water compartment includes a DCMD condenser to condense the water vapor passing through the membrane. Further, the absorber is in fluid communication with the second heat exchanger and configured to pass a solution from the absorber to the second heat exchanger via a second pump. The second heat exchanger is in fluid communication with the first heat exchanger and configured to pass the solution from the second heat exchanger to the first heat exchanger via a first pump. The first heat exchanger is in fluid communication with the first desorber and configured to pass the solution from the first heat exchanger to the first desorber to heat the solution in the first desorber with a heater. The first desorber is in fluid communication with the first heat exchanger and configured to return a first separated desorber stream to the first heat exchanger. The first desorber is in fluid communication with the second desorber and configured to pass a second separated desorber stream to the second desorber. The first heat exchanger is in fluid communication with the condenser and configured to pass the first separated desorber stream from the first heat exchanger to the condenser via a first throttle valve. The second desorber is in fluid communication with the condenser and configured to pass the second separated desorber stream from the second desorber to the condenser via a second throttling valve. The second desorber is in fluid communication with the second heat exchanger and configured to pass a first heat exchanger stream from the second desorber to the second heat exchanger. The second heat exchanger is in fluid communication with the absorber and configured to pass the first heat exchanger stream from the second heat exchanger to the absorber via a third throttling valve. The condenser is in fluid communication with the DCMD-Abs section and configured to pass a first stream from the condenser to the DCMD-Abs section to produce water. The condenser is in fluid communication with the evaporator and configured to pass a rejected DCMD-Abs stream from the condenser to the evaporator via a fourth throttling valve. The absorber is in fluid communication with the DCMD-Abs section and configured to pass a second stream from the absorber to the DCMD-Abs section to produce water.

In one or more exemplary embodiments, the saltwater feed compartment of the DCMD-Abs section is in fluid communication with the water compartment of the DCMD-Abs section by passing a combined stream, including the first stream and the second stream, from the saltwater feed compartment to the water compartment through the membrane.

In one or more exemplary embodiments, the produced water from the DCMD-Abs section is collected in a tank disposed at an outlet of the DCMD-Abs section.

In one or more exemplary embodiments, the condenser, the evaporator, and the absorber share a common housing. Further, a condenser inlet and an absorber inlet are configured to receive the saline water feed stream within the common housing.

In one or more exemplary embodiments, the condenser inlet and the absorber inlet receive the saline water feed stream at a same height relative to the common housing.

In one or more exemplary embodiments, the saltwater feed compartment of the DCMD-Abs section and the water compartment of the DCMD-Abs section define a DCMD-Abs module. Further, the system comprises from 5 to 25 DCMD-Abs modules.

In one or more exemplary embodiments, the system further comprises a saltwater pump to pump a portion of the saline water feed stream to both the condenser and the absorber.

In one or more exemplary embodiments, a mass flow rate of the saline water feed stream sent to the absorber is from 1.4 to 1.7 times greater than a mass flow rate of the saline water feed stream sent to the condenser.

In one or more exemplary embodiments, the heater for the first desorber is at least one selected from the group consisting of a space heater, heating pipes, a furnace, and a boiler.

In one or more exemplary embodiments, the membrane is at least one selected from the group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane.

In one or more exemplary embodiments, the first heat exchanger is at least one selected from the group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more exemplary embodiments, the second heat exchanger is at least one selected from the group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more exemplary embodiments, the DCMD-Abs modules are arranged in a counter-current configuration.

In one or more exemplary embodiments, the DCMD-Abs modules are arranged in a parallel/cross flow configuration.

In one or more exemplary embodiments, the system employs water as a refrigerant.

In one or more exemplary embodiments, the absorber is in fluid communication with a first module of the DCMD-Abs section through a first module inlet.

In one or more exemplary embodiments, the condenser is in fluid communication with the first module of the DCMD-Abs section through a first module inlet.

In one or more exemplary embodiments, a first module of the DCMD-Abs section is in fluid communication with a second module of the DCMD-Abs section and configured to pass a combined stream, including the first stream and the second stream, from a first module outlet to a second module inlet.

In one or more exemplary embodiments, a heat transfer fluid employed in both the first heat exchanger and the second heat exchanger is at least one molten salt selected from the group consisting of sodium nitrate and potassium nitrate.

In one or more exemplary embodiments, the saltwater feed compartment of the DCMD-Abs section includes a discharge line configured to remove excess brine within the saltwater feed compartment.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
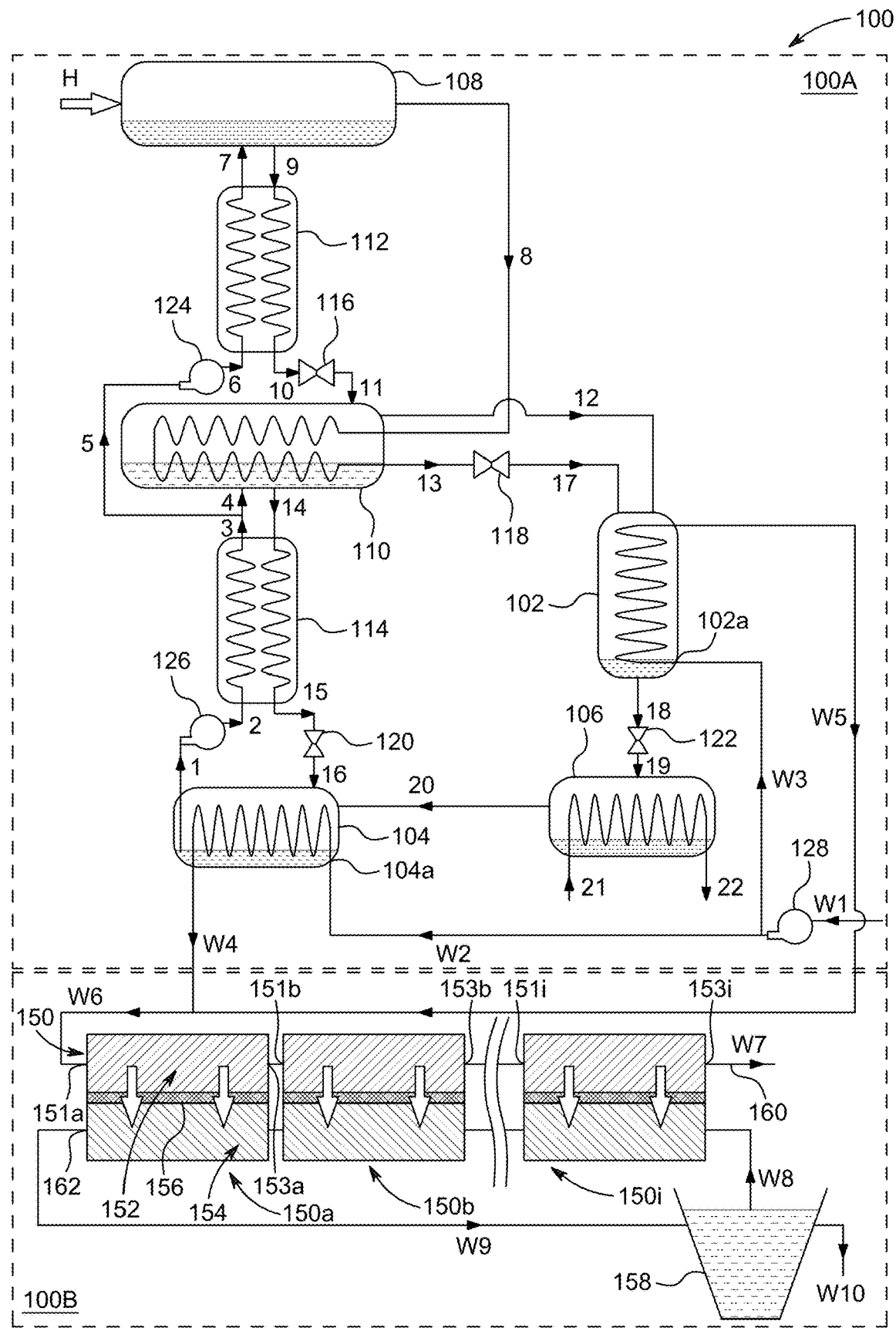
FIG. 1 is a schematic diagram of a vapor-absorption refrigeration (VAR) system integrated with a direct contact membrane distillation-absorber (DCMD-Abs) section, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a vapor-absorption refrigeration (VAR) system, for utilizing waste-heat of the VAR to efficiently power a series-multistage direct contact membrane distillation (DCMD) section for freshwater production. In particular, the present disclosure describes powering a series-multistage DCMD section by the heat released from an absorber and condenser of a double-effect VAR in such a way, that two products, i.e., freshwater and a cooling stream, are obtained with low energy consumption. Further in the present VAR system, the feed of the DCMD section is split to cool the condenser and the absorber of the VAR and get sufficient heat to drive series-modules of the DCMD section. Under the applied conditions, the present VAR system shows performance better than a standalone VAR as well as a standalone DCMD system. Also, it has been found that the series-multistage DCMD section, as integrated in the present VAR system, performs better than a parallel multistage DCMD plant under the same operating conditions.

The present disclosure describes the thermal and economic performance of a series-multistage DCMD plant driven by a VAR system. The feed saline water of the DCMD plant receives heat from the condenser and evaporator of the VAR system. Water production and a cooling effect are the main products of this integration. The evaporator cooling is used for the air-cooling effect, or as used herein, an air-conditioning purpose. The results are represented in terms of the amount of freshwater produced, cooling capacity, coefficient of performance (COP), gained output ratio (GOR), and energy utilization factor (EUF) (which accounts for both subsystems' performance). An economic model is used to evaluate both the cooling effect and produced water costs. The optimal performance indices show that the produced water is 1443 L/h, the cooling capacity is 123.4 ton of refrigeration (TR), the COP is 1.09, the GOR is 2.42, the EUF is 3.50, the freshwater cost is about 3.87 \$/m$^3$, and the cooling effect cost is about 0.0047 \$/kWh. A comparison between the present series-multistage DCMD plant and a parallel one [See: Qasem N A A, Lawal D U, Aljundi I H, Abdallah A M, Panchal H. Novel integration of a parallel-multistage direct contact membrane distillation plant with a double-effect absorption refrigeration system. Appl Energy 2022; 323:119572], incorporated herein by reference in its entirety, besides the standalone systems is also investigated.

Referring to FIG. 1, illustrated is a schematic diagram of a vapor-absorption refrigeration (VAR) system, represented by reference numeral 100 and hereinafter sometimes referred to as "system 100" for brevity. In the present embodiments, the VAR system 100 includes a VAR section (as represented by reference numeral 100A), which is a double-effect VAR plant. Such double-effect VAR has a higher COP and provides enhanced utilization of input energy. Basic working principle of the double-effect VAR remains same as a single-effect VAR but additional components, such as multiple desorbers and heat exchangers (as discussed later) for the vapor absorption cycle, may effectively provide two single-effect systems, and thereby double the COP as that of a single-effect absorption system. The VAR system 100 further includes a direct contact membrane distillation-absorber (DCMD-Abs) section (as represented by reference numeral 100B, and sometimes referred to as "DCMD section"). DCMD is a membrane distillation (MD) configuration in which both solutions, feed and permeate, are in a direct contact with a hydrophobic porous membrane. Thus, the water vapor transferred across the membrane is directly condensed in a cold permeate inside the membrane module, as discussed later in the description in more detail.

As illustrated in FIG. 1, the VAR system 100 includes a condenser 102, an absorber 104 and an evaporator 106. The VAR system 100 also includes two desorbers, namely a first desorber 108 and a second desorber 110. In some embodiments, the condenser 102 can accommodate a flow rate entering the inlet or exiting the outlet of from 1 gallon/minute to 20 gal/min, preferably 2 gal/min to 18 gal/min, preferably 4 gal/min to 16 gal/min, preferably 6 gal/min to 14 gal/min, preferably 8 gal/min to 12 gal/min, or 10 gal/min. In some embodiments, the condenser 102 can accommodate temperatures ranging from 10° C. to 50° C., preferably 12.5° C. to 47.5° C., preferably 15° C. to 45° C., preferably 17.5° C. to 42.5° C., preferably 20° C. to 40° C., preferably 22.5° C. to 37.5° C., preferably 25° C. to 35° C., preferably 27.5° C. to 32.5° C., or 30° C. In some embodiments, the condenser 102 includes a fan disposed/housed within the condenser itself. In some embodiments, the absorber 104 also consists of a series of tube bundles over which a strong concentration of absorbent, preferably water, is sprayed or dripped. In some embodiments, the absorber 104 has between 4 and 20 bundles, preferably 6 to 18, preferably 8 to 16, preferably 10 to 14, or 12 bundles. In some embodiments, the evaporator 106 contains chilled water tubes made out of steel, PVC, metal, plastic, iron, or alloys. In some embodiments, the tubes of the evaporator 106 have a diameter of from 10 mm to 100 mm, preferably 20 mm to 90 mm, preferably 30 mm to 80 mm preferably 40 mm to 70 mm preferably 50 mm to 60 mm, or 55 mm. The first desorber 108 and second desorber 110 may be a tank or other vessel including an inlet, a first and an outlet. The inlet of each desorber may receive a mixture (e.g., a solution) of a first fluid (e.g., a solvent) and a second fluid (e.g., a solute). The first fluid may be water or another refrigerant. The second fluid is an absorbent (e.g., a salt, such as lithium bromide, for example). That is, the mixture of the first and second fluids received through the inlet may be a solution of the second fluid dissolved in the first fluid. The first desorber 108 and second desorber 110 may be heated (directly or indirectly) by a heat source, such as a burner, boiler, solar heat, electric heat, steam, hot water, waste heat from another system or machine, and/or any other heat source. As heat is transferred to the mixture of the first and second fluids within the respective desorbers, the first fluid desorbs from the second fluid so that the first fluid can separate from the second fluid. The VAR system 100 further includes two heat exchangers, namely a first heat exchanger 112 and a second heat exchanger 114. In an example embodiment, the first heat exchanger 112 is at least one selected from the group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger. Similarly, the second heat exchanger 114 is at least one selected from the group consisting of the plate heat exchanger, the tube in tube heat exchanger, the shell and tube heat exchanger, the plate and shell heat exchanger, the plate fin heat exchanger, the double tube heat exchanger, the adiabatic wheel heat exchanger, and the finned tube heat exchanger, without any limitations. Further, in some embodiments, a heat transfer fluid employed in both the first heat exchanger 112 and the second heat exchanger 114 and is at least one molten salt selected from the group consisting of sodium nitrate and potassium nitrate. In an embodiment, the absorber 104, the first desorber 108, the second desorber 110, the first heat exchanger 112, and the second heat exchanger 114 are housed within a first housing. In an embodiment, the condenser 102 and the evaporator 106 are housed within a second housing. In an embodiment, all the components of the VAR section 100A are housed within the same housing.

The VAR system 100 also includes at least four throttling valves, herein as a first throttling valve 116, a second throttling valve 118, a third throttling valve 120 and a fourth throttling valve 122. In some embodiments, the first throttling valve 116, the second throttling valve 118, the third throttling valve 120 and the fourth throttling valve 122 can each accommodate pressures ranging from between 50 pounds per square inch (psi) to 500 psi, preferably 100 psi to 450 psi, preferably 150 psi to 400 psi, preferably 200 psi to 350 psi, preferably 250 psi to 300 psi, or 275 psi. The VAR system 100 further includes at least two pumps, herein as a first pump 124 and a second pump 126 . . . . In some embodiments, the first pump 124 and the second pump 126 can each accommodate a flow rate of from 5 gallon/minute to 40 gal/min, preferably 10 gal/min to 35 gal/min, preferably 15 gal/min to 30 gal/min, preferably 20 gal/min to 25 gal/min, or 22.5 gal/min. In some embodiments, the first pump 124 and the second pump 126 each requires a power of 3000 Watts (W) to 15,000 W, preferably 4,000 W to 14,000 W, preferably 5,000 W to 13,000 W, preferably 6,000 W to 12,000 W, preferably 7,000 W to 11,000 W, preferably 8,000 W to 10,000 W, or 9,000 W. In some embodiments, the first pump 124 and the second pump 126 are each an axial flow pump. In the present VAR system 100, the use of multiple throttling valves 116, 118, 120, 122 and multiple pumps 124, 126 supports its double-effect cooling operation, as required. In general, in the VAR system 100, the evaporator 106 is configured for evaporating a refrigerant and providing the cooling effect. In an embodiment, the VAR system 100 employs water as a refrigerant without any limitations. The absorber 104 is provided with an absorbent solution (also simply referred to as "solution") and disposed in connection with the evaporator 106 to receive the refrigerant therefrom. The absorbent solution, which is the working fluid for the VAR section 100A, may be lithium bromide (LiBr) solution without any limitations. In general, the absorber 104 is configured for absorbing the refrigerant by the absorbent solution. The desorbers 108, 110 are configured for heating the refrigerant and the absorbent solution to obtain vapors of the refrigerant. The condenser 102 is configured for condensing the vapors of the refrigerant.

In particular, in the VAR system 100, as depicted in FIG. 1, a saline water feed stream (as represented by 'W1') is received. The saline water feed stream 'W1' is split to provide a saline water feed stream 'W2' and a saline water feed stream 'W3'. The saline water feed stream 'W2' is received at the absorber 104, and the saline water feed stream 'W3' is received at the condenser 102. As shown, the VAR system 100 includes a saltwater pump 128 to pump a portion of the saline water feed stream 'W1' to both the condenser 102 and the absorber 104. In an embodiment, the saltwater pump 128 has the same flow and power requirements of the first pump 124 and the second pump 126. In an embodiment, the saltwater pump 128 is a centrifugal pump. In an example, a mass flow rate of the saline water feed stream 'W2' sent to the absorber 104 is from 1.4 to 1.7 times greater than a mass flow rate of the saline water feed stream 'W3' sent to the condenser 102 (i.e., 60% or little more of the total saline water feed stream 'W1' is utilized to cool the absorber 104), preferably from 1.45 to 1.65 times greater, preferably from 1.5 to 1.6 times greater, or 1.55 times greater. In an embodiment, the total mass flow rate of stream W1 is of from 0.5-2.0 kg/s, preferably 1.25 kg/s. Herein, the absorber 104 has an absorber inlet 104a configured to receive the saline water feed stream 'W2', and the condenser 102 has a condenser inlet 102a configured to receive the saline water feed stream 'W3'. In an embodiment, the absorber inlet 104a is shaped as a cylinder or a funnel and is fabricated of metal. In an embodiment, the condenser inlet 102a is shaped as a cylinder or a funnel and is fabricated of metal. In an example embodiment, the condenser 102, the evaporator 106, and the absorber 104 share a common housing (not shown). In the VAR section 100A, the condenser inlet 102a and the absorber inlet 104a are configured to receive the saline water feed stream 'W3' and 'W2', respectively, within the common housing. In one or more examples, the condenser inlet 102a and the absorber inlet 104a receive the saline water feed stream 'W3' and 'W2', respectively, at a same height relative to the common housing. Receiving the saline water feed stream 'W3' and 'W2' at the same height in the common housing minimizes the amount of piping used within the VAR section 100A, which thereby reduces the construction and operating costs.

In the VAR section 100A, a weak solution (i.e., a weak absorbent solution) is heated in the first desorber 108 using a heater (as represented by 'H'), so some water evaporates and leaves at state '8' and residual strong solution is left therein. In an example, the heater 'H' for the first desorber 108 is at least one selected from the group consisting of a space heater, heating pipes, a furnace, and a boiler. In an embodiment, the heater 'H' is housed within the first desorber 108. In an embodiment, the heater, 'H' is disposed external to the desorber 108. The first desorber 108 is in fluid communication with the first heat exchanger 112 and configured to return a first separated desorber stream (i.e., the residual strong solution) to the first heat exchanger 112. Further, the first desorber 108 is in fluid communication with the second desorber 110 and configured to pass a second separated desorber stream (i.e., water vapor) to the second desorber 110. Herein, the residual strong solution leaves the first desorber 108 at state '9', passing through the first heat exchanger 112 for preheating weak solution flowing into the first heat exchanger 112 at state '6' from the first pump 124 and exiting at state '7'. Further, in the second desorber 110, a hot strong solution is mixed with the weak solution inserted at state '4' (as discussed later). The mixture is additionally heated by the water vapor flowing in pipe of the second desorber 110 coming from the first desorber 108 at the state '8' (as discussed above).

Further, the first heat exchanger 112 is in fluid communication with the condenser 102 and configured to pass the first separated desorber stream (i.e., the residual strong solution) from the first heat exchanger 112 to the condenser 102 (as water vapor generated from heat of the residual strong solution in the second desorber 110) via the first throttling valve 116. That is, in an embodiment, the first separated desorber stream goes straight from the first heat exchanger 112 to the condenser 102 without passing through the second desorber 110. Further, the second desorber 110 is in fluid communication with the condenser 102 and configured to pass the second separated desorber stream (i.e., the water vapor from the first desorber 108) from the second desorber 110 to the condenser 102 via the second throttling valve 118. That is, the residual strong solution from the first desorber 108 at the state '9' is passed through the first heat exchanger 112 to lose heat to be at state '10'. The residual strong solution is then throttled by the first throttling valve 116 from the state '10' to state '11', to be at a same condition of the second desorber 110. Herein, water vapor is generated in the second desorber 110 which may enter the condenser 102 at state '12'. Further, the water vapor of the first desorber 108 leaves at state '8' to enter pipe of the second desorber 110, which then exits the second desorber 110 at state '13' and is subsequently throttled by the second throttling valve 118 to state '17' to enter the condenser 102 together with water vapor generated from the second desorber 110 at the state '12'.

Further, the second desorber 110 is in fluid communication with the second heat exchanger 114 and configured to pass a first heat exchanger stream (i.e., remaining strong solution in the second desorber 110) from the second desorber 110 to the second heat exchanger 114. That is, the remaining strong solution in the second desorber 110 leaves at state '14' to enter the second heat exchanger 114 and leaves at state '15' therefrom by recovering some heat from weak solution received from the absorber 104 (as discussed later) coming in at state '2' and leaving at state '3' through the second heat exchanger 114. Furthermore, the second heat exchanger 114 is in fluid communication with the absorber 104 and configured to pass the first heat exchanger stream (i.e., heated strong solution) from the second heat exchanger 114 to the absorber 104 via the third throttling valve 120. That is, the heated strong solution at the state '15' is then throttled by the third throttling valve 120 to state '16', which then enters the absorber 104.

The absorber 104 is used to mix the received strong solution at the state '16' using water vapor coming from the evaporator 106 at state '20' (as discussed later) and further cool the received strong solution with the help of the saline water feed stream 'W2', which in turn provides a saline water feed stream 'W4' at a relatively higher temperature compared to the saline water feed stream 'W2'. Also, the absorber 104 is in fluid communication with the second heat exchanger 114 and configured to pass the solution from the absorber 104 to the second heat exchanger 114 via the second pump 126. That is, the resultant weak solution, formed in the absorber 104, at state '1' is pumped via the second pump 126 to enter the second heat exchanger 114 at state '2', and gain some heat in the second heat exchanger 114 to be at state '3'. Further, the second heat exchanger 114 is in fluid communication with the first heat exchanger 112 and configured to pass the solution from the second heat exchanger 114 to the first heat exchanger 112 via the first pump 124. In particular, the heated weak solution at the state '3' is split into two streams, with one stream entering the second desorber 110 at the state '4', and the other steam at state '5' being pumped by the first pump 124 to the state '6' to be passed to the first heat exchanger 112 to gain some more heat to be at state '7'. Furthermore, the first heat exchanger 112 is in fluid communication with the first desorber 108 and configured to pass the solution from the first heat exchanger 112 to the first desorber 108 to heat the solution in the first desorber 108 with the heater 'H'. That is, the heated stream at the state '7' from the first heat exchanger 112 enters the first desorber 108 (as discussed above) and is further heated therein by heat provided by the heater 'H'.

As discussed, the water vapor of the first desorber 108 leaves at the state '8' to enter pipe of the second desorber 110, which then exits the second desorber 110 at the state '13' and is subsequently throttled by the second throttling valve 118 to the state '17' to enter the condenser 102 together with water vapor generated from the second desorber 110 at the state '12'. The received water vapors are condensed at the condenser 102 with the help of the saline water feed stream 'W3' flowing in pipe of the condenser 102 and leaving therefrom as a saline water feed stream 'W5'. Thereby, a saturated liquid is formed in the condenser 102. Further, the condenser 102 is in fluid communication with the evaporator 106 and configured to pass a rejected DCMD-Abs stream (i.e., the saturated liquid) from the condenser 102 to the evaporator 106 via the fourth throttling valve 122. That is, the saturated liquid exits the condenser 102 at state '18' to be throttled by the fourth throttling valve 122 to provide cooled saturated liquid at state '19' which enters the evaporator 106. The evaporator 106, in turn, uses the cooled saturated liquid to cool chiller water entering therein at state '21' and exiting therefrom at state '22' for providing the cooling effect.

Further, in the VAR section 100A, the absorber 104 is in fluid communication with the DCMD-Abs section 100B and configured to pass a second stream (i.e., the saline water feed stream 'W4') from the absorber 104 to the DCMD-Abs section 100B to produce water (as discussed in the proceeding paragraphs in detail). Also, in the VAR section 100A, the condenser 102 is in fluid communication with the DCMD-Abs section 100B and configured to pass a first stream (i.e., the saline water feed stream 'W5') from the condenser 102 to the DCMD-Abs section 100B to produce water (as discussed in the proceeding paragraphs in detail). In particular, as shown in FIG. 1, a combined stream (represented by a saline water feed stream 'W6'), including the first stream 'W5' and the second stream 'W4', is passed to the DCMD-Abs section 100B.

Further, as illustrated in FIG. 1, the DCMD-Abs section 100B, in the VAR system 100, includes multiple DCMD-Abs modules (collectively represented by reference numeral 150). In the illustrated example, the VAR system 100 is shown to include a first module 150a, a second module 150b, and an end module 150i, with 'i' representing a total number of the DCMD-Abs modules 150. In an example, the VAR system 100 includes from 5 to 25 DCMD-Abs modules 150, preferably from 10 to 20 DCMD-Abs modules, or 15 DCMD-Abs modules. In an embodiment, the DCMD-modules are rectangular in shape. In an embodiment, the DCMD-Abs modules are square in shape, pentagonal in shape, or any other polygonal shape. In an embodiment, each DCMD-Abs module 150 has its outer walls fabricated of a metal or a plastic.

In an embodiment, a middle DCMD-Abs module 150 is equally spaced between the right-neighboring DCMD-Abs module 150 and the left-neighboring DCMD-Abs module 150. In an embodiment, a middle DCMD-Abs module 150 is not equally spaced between the right-neighboring DCMD-Abs module 150 and the left-neighboring DCMD-Abs module 150. In an embodiment, all the DCMD-Abs modules 150 of the DCMD section 100B are housed within the same housing, which is a different housing than the housing for the VAR section 100A. Thus, creating a first housing for the VAR section 100A and a second housing for the DCMD section 100B. In an embodiment, all the DCMD-Abs modules 150 of the DCMD section 100B are housed within the same housing as the housing for the VAR section 100A, creating one entire housing for the VAR system 100. The DCMD-Abs section 100B, on in particular each one of the DCMD-Abs modules 150, includes a saltwater feed compartment 152 and a water compartment 154. The saltwater feed compartment 152 and the water compartment 154 are separated by a membrane 156. In the present embodiments, the membrane 156 is at least one selected from the group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane, without any limitations. In an embodiment, the membrane 156 is a polytetrafluoroethylene (PTFE) membrane. In an embodiment, the membrane 156 has a pore size ranging from 0.3 µm to 0.6 µm, preferably from 0.4 µm to 0.5 µm, or 0.45 µm In particular, the membrane 156 is hydrophobic membrane. In an embodiment, the membrane 156 has a cooling permeate temperature of from 25° C. to 50° C., preferably from 30° C. to 45° C., preferably from 35° C. to 40° C., or 37.5° C. In an embodiment, the membrane 156 accommodates a salinity of from 2 g/kg to 43 g/kg of salt per kg of solution passing through the membrane 156, preferably from 5 g/kg to 40 g/kg, preferably from 10 g/kg to 30 g/kg, or 20 g/kg; the membrane 156 accommodates a permeate flow rate of from 2 L/min to 10 L/min, preferably from 4 L/min to 8 L/min, or 6 L/min; and the membrane 156 accommodates a feed flow rate of from 2 L/min to 10 L/min, preferably from 4 L/min to 8 L/min, or 6 L/min. Such membranes are well known in the art and thus not described herein. In an embodiment, the membrane 156 separates the DCMD-Abs module into equal sections by area, wherein the area of the saltwater feed compartment 152 is equal to the area of the water compartment 154. In an embodiment, the membrane 156 separates the DCMD-Abs module into unequal sections by area, wherein the area of the saltwater feed compartment 152 is different to the area of the water compartment 154. Further, the area of the saltwater feed compartment 152 is from 1.1 to 1.3 times greater than the area of the water compartment 154, preferably 1.2 times greater. Even further, the area of the water compartment 154 is from 1.1 to 1.3 times greater than the area of the saltwater feed compartment 152, preferably 1.2 times greater. In an embodiment, the saltwater feed compartment 152 is fabricated of the same metal as the water compartment 154. In an embodiment, the saltwater feed compartment 152 is fabricated of a different metal as the water compartment 154.

As shown, in the DCMD-Abs section 100B, the saltwater feed compartment 152 of the DCMD-Abs section 100B and the water compartment 154 of the DCMD-Abs section 100B define the DCMD-Abs module 150. For purposes of the present disclosure, the individual saltwater feed compartments 152 of all of the DCMD-Abs modules 150, the individual water compartments 154 of all of the DCMD-Abs modules 150 and the individual membranes 156 of all of the DCMD-Abs modules 150 have been, sometimes, collectively referred to as the saltwater feed compartment 152, the water compartment 154 and the membrane 156, respectively, for explanation purposes. In the present embodiments, as shown, the DCMD-Abs modules 150 are connected to each other in series. The first module 150a of the DCMD-Abs section 100B has a first module inlet 151a and a first module outlet 153a. In an embodiment, the first module inlet 151a and the first module outlet 153a are shaped like funnels or tubes. In an embodiment, the first module inlet 151a and the first module outlet 153a are disposed at the same height relative to the DCMD-Abs module 150. In an embodiment, the first module inlet 151a and the first module outlet 153a have the same diameter. In an embodiment, the first module inlet 151a and the first module outlet 153a have a different diameter. Similarly, the second module 150b of the DCMD-Abs section 100B has a second module inlet 151b and a second module outlet 153b; and the end module 150i of the DCMD-Abs section 100B has an end module inlet 151i and an end module outlet 153i. Each module outlet and inlet have similar sizing, shape, and diameter requirements as the first module inlet 151a and first module outlet 153a. In an embodiment, the diameter of the first module inlet 151a is from 1.1 to 1.3 times greater than a diameter of the second module inlet 151b, or 1.2 times greater.

As shown, the absorber 104 is in fluid communication with the first module 150a of the DCMD-Abs section 100B through the first module inlet 151a, to pass the saline water feed stream 'W4' thereto. Further, the condenser 102 is in fluid communication with the first module 150a of the DCMD-Abs section 100B through the first module inlet 151a, to pass the saline water feed stream 'W5' thereto. In particular, in the VAR system 100, the saline water feed streams 'W2' and 'W3' (split from the saline water feed stream 'W1') gain some heat from the absorber 104 and the condenser 102, respectively; then leave as the saline water feed streams 'W4' and 'W5', respectively; and combined again to form a combined stream as the saline water feed stream 'W6' to enter the first module 150a of the DCMD-Abs section 100B.

Further, in each DCMD-Abs modules 150, the saltwater feed compartment 152 and the water compartment 154 provide hot saline water feed stream channels and cooling water stream permeate channels, respectively. In an exemplary embodiment, the DCMD-Abs modules 150 are arranged in a counter-current configuration, to receive flow of the saline water feed stream 'W6' and a cooling water stream (as represented by 'W8'), from a tank 158, in opposite directions to each other. In other embodiments, the DCMD-Abs modules 150 may be arranged in a parallel/cross flow configuration, without departing from the spirit and the scope of the present disclosure. In an embodiment, the tank 158 is fabricated of metal. In an embodiment, the tank 158 can collect hold from 1 gallon to 20 gallons of water, preferably from 5 gallons to 15 gallons, or 10 gallons.

In the DCMD-Abs section 100B, the membrane 156 permits water vapor to pass from the saltwater feed compartment 152 to the water compartment 154. In particular, the saltwater feed compartment 152 of the DCMD-Abs section 100B is in fluid communication with the water compartment 154 of the DCMD-Abs section 100B by passing the combined stream 'W6', including the first stream 'W5' and the second stream 'W4', from the saltwater feed compartment 152 to the water compartment 154 through the membrane 156. In some examples, the water compartment 154 includes a DCMD condenser (not shown) to condense the water vapor passing through the membrane 156. Specifically, due to temperature difference, water is evaporated closer to the hot saline water feed stream channels in the saltwater feed compartment 152 and passes through the membrane 156 to the cooling water stream permeate channels in the water compartment 154.

Further, herein, the first module 150a of the DCMD-Abs section 100B is in fluid communication with the second module 150b of the DCMD-Abs section 100B (being in series connection) and configured to pass the combined stream 'W6', including the first stream 'W5' and the second stream 'W4', from the first module outlet 153a to the second module inlet 151b. Specifically, as the DCMD-Abs modules 150 are connected in series, the saline water feed stream 'W6' at high temperature and the cooling water stream 'W8' at low temperature pass consecutively from each of the DCMD-Abs modules 150, and thereby some water vapor flux leaves from the saltwater feed compartments 152 to be condensed and added to the water compartments 154 of the DCMD-Abs section 100B. Herein, the saltwater feed compartment 152 of the DCMD-Abs section 100B includes a discharge line 160 configured to remove excess brine within the saltwater feed compartment 152 as stream 'W7'. The produced water from the DCMD-Abs section 100B, from the water compartment 154, is passed as water stream 'W9' to be collected in the tank 158 disposed at an outlet 162 of the DCMD-Abs section 100B, which may then be extracted as water stream 'W10', as required. In an embodiment, a singular iron pipe connects the outlet 162 to the tank 158. In an embodiment, a diameter of the cylindrical outlet 162 is larger than the respective diameters of the DCMD-Abs module inlet or outlet in any stage. In an embodiment, a diameter of the cylindrical outlet 162 is equal to the respective diameters of the DCMD-Abs module inlet or outlet in any stage. In an embodiment, a diameter of the cylindrical outlet 162 is different from the respective diameters of the DCMD-Abs module inlet or outlet in any stage.

Further, in the present disclosure, a simulation model ("model") of the system 100 is considered based on mass and energy balances. The model is assumed to be under steady-state conditions. The absorbent solution as used in the system 100 is assumed to be homogenous and stable. Further, temperatures of the chiller water at state '21' and at state '22' are considered to 12° C. and 7° C. [See: AHRI. 2018 standard for performance rating of water-chilling and heat pump water-heating packages using the vapor compression cycle 2018:105], incorporated herein by reference in its entirety.

The required energy to drive the DCMD-Abs section 100B for the saline water feed stream 'W6' is presented as $$(\dot{m}h)_{w6} = (\dot{m}h)_{w4} + (\dot{m}h)_{w5} \quad (1)$$

where $\dot{m}$ and h represent total mass flow rate and specific enthalpy, respectively. The power required for all DCMD-Abs modules 150 of the DCMD-Abs section 100B is stated as, $$\dot{Q}_{DCMD,f} = \sum_i^n \dot{Q}_{DCMD,f,i} = (\dot{m}h)_{w6} - (\dot{m}h)_{w7} \quad (2)$$

The cooling water's heat transfer rate can be stated as, $$\dot{Q}_{DCMD,p} = \sum_i^n \dot{Q}_{DCMD,p,i} = (\dot{m}h)_{w9} - (\dot{m}h)_{w8} \quad (3)$$

where 'n' indicates the number of modules and 'i' represents DCMD-Abs module i. The feed and permeate channels are denoted by the letters 'f' and 'p', respectively. The run power for each module is divided by the number of channels and expressed as, $$\dot{Q}_{DCMD,f,i} = \sum_{j=1}^N \dot{Q}_{ch,f,j} = \sum_{j=1}^N (\dot{m}h)_{f,in,j} - \sum_{j=1}^N (\dot{m}h)_{f,out,j} \quad (4)$$

where 'N' and 'j' represent the total number of channels, and the number of channels in the DCMD-Abs module, respectively. A similar equation can be used for permeating side as, $$\dot{Q}_{DCMD,p,i} = \sum_{j=1}^N \dot{Q}_{ch,p,j} = \sum_{j=1}^N (\dot{m}h)_{p,out,j} - \sum_{j=1}^N (\dot{m}h)_{p,in,j} \quad (5)$$

Herein, the total mass flow rate ($\dot{m}_{w6}$) is used the same for each module in the series modules, taking into consideration some subtraction for water permeates, which is added to the permeate channel mass flow rate. The details of the used models are described later in the description using Table A1 and Table A2.

Further, the products of the present system 100 are the cooling capacity ($\dot{Q}_{Evap}$) and produced water ($\dot{m}_{pw}$). GOR, COP, and EUF are used for evaluating the power consumption effectiveness as:

$$GOR = \frac{\dot{Q}_{DCMD,useful}}{\dot{Q}_{ht} + \dot{W}_{Pump\#1} + \dot{W}_{Pump\#2}} \quad (6)$$

$$COP = \frac{\dot{Q}_{Evaporator}}{\dot{Q}_{ht} + \dot{W}_{Pump\#1} + \dot{W}_{Pump\#2}} \quad (7)$$

$$EUF = \frac{\dot{Q}_{DCMD,useful} + \dot{Q}_{Evaporator}}{\dot{Q}_{ht} + \dot{W}_{Pump\#1} + \dot{W}_{Pump\#2}} \quad (8)$$

Furthermore, the input operational and constructive factors used to evaluate the performance of the present system 100 are listed in Table 1 below.

TABLE 1

The suggested system's operative and constructive parameter values. Unless otherwise specified, these values are utilized in the results section.

| Parameter | Value |
|---|---|
| Weak solution mass flow rate, $\dot{m}_1$ | 1 kg/s |
| $UA_{evaporator}$ | 85 KW/K [33] |
| $UA_{Absorbor}$ | 50 KW/K [33] |
| $UA_{Des\#1}$ | 25 KW/K [33] |
| $UA_{Des\#2}$ | 10 KW/K [33] |
| $UA_{Cond}$ | 65 KW/K [33] |
| $UA_{HX\#1}$ | 2 KW/K [33] |
| $UA_{HX\#2}$ | 1.25 KW/K [33] |
| High-pressure of VAR, $P_h$ | $P_{sat}$ at $T_{13}$ |
| Medium-pressure of VAR, $P_m$ | $P_{sat}$ at $T1_8$ |
| Low-pressure of VAR, $P_l$ | $P_{sat}$ at $T_{20}$ |
| Pumping devices efficiency, η | 0.72 |
| DCMD channel length | 0.7 m |
| DCMD channel width | 0.5 m |
| DCMD channel thickness | 1 mm |
| Feed water temperature, $T_{w1} = T_f$ | 25° C. |
| Permeate water temperature, $T_{w8} = T_p$ | 25° C. |

TABLE 1-continued

The suggested system's operative and constructive parameter values. Unless otherwise specified, these values are utilized in the results section.

| Parameter | Value |
|---|---|
| The total feed mass flow rate, $\dot{m}_{w1} = \dot{m}_f$ | 10 kg/s |
| The total permeate water mass flow rate, $\dot{m}_{w8} = \dot{m}_p$ | 10 kg/s |
| Ratio of feed water goes to the absorber | 0.5 |
| Saline water salinity, S | 35 g/kg |
| Number of channels in a DCMD module | 30 |
| Number of modules | 5 |
| Membrane thickness, $\delta_m$ | 145.0 μm |
| Membrane porosity, ε | 0.80 |
| Pore diameter, $D_p$ | 0.379 μm |
| Membrane thermal conductivity, $k_m$ | 0.18 W/m · K |

5 In Table 1 above, details about DCMD channel thickness are obtained from Hwang H J et al. [See: Hwang H J, He K, Gray S, Zhang J, Moon I S. Direct contact membrane distillation (DCMD): Experimental study on the commercial PTFE membrane and modeling. J Memb Sci 2011; 371:90-8], incorporated herein by reference in its entirety; and details about membrane thickness, membrane porosity, pore diameter and membrane thermal conductivity are obtained from Khalifa A, Ahmad H et al. [See: Khalifa A, Ahmad H, Antar M, Laoui T, Khayet M. Experimental and theoretical investigations on water desalination using direct contact membrane distillation. Desalination 2017; 404:22-34], incorporated herein by reference in its entirety.

Herein, the system was implemented and solved using engineering equations solver (EES) software [See: EES: Engineering Equation Solver|F-Chart Software: Engineering Software 2020], incorporated herein by reference in its entirety. The thermodynamic properties of the investigated fluids are embedded in EES [See: Generous M M, Qasem N A A, Qureshi B A, Zubair S M. A comprehensive review of saline water correlations and data-Part I: Thermodynamic properties. Arab J Sci Eng 2020; 45:8817-76, and Qasem N A A, Generous M M, Qureshi B A, Zubair S M. A Comprehensive Review of Saline Water Correlations and Data: Part II—Thermophysical Properties. Arab J Sci Eng 2021; 46:1941-79], incorporated herein by reference in their entirety. The EES solves a number of algebraic equations that are equal to the number of unknowns. The solution starts with a guess value for every unknown, and all equations are solved implicitly. The obtained values for the unknowns are considered new guess values, which are repeated until obtaining a convergent solution when the error is less than 10-6.

Further, both cooling effect and produced water costs were estimated based on some assumptions. For instance, in an example scenario, the first desorber 108 is powered by a natural gas combustion process with a gas unit cost of $4.0 per million metric British thermal units and an 83.9% efficiency. The pumps are powered by photovoltaic panels (PV). The labor costs are considered 0.1$/m³ of produced water [See: El-Dessouky H T, Ettouney H M. Fundamentals of salt water desalination. Fundam Salt Water Desalin 2002]. The annual maintenance cost is assumed to be 1.5% of the construction cost [See: Wang Y, Lior N. Thermoeconomic analysis of a low-temperature multi-effect thermal desalination system coupled with an absorption heat pump. Energy 2011; 36:3878-87, incorporated herein by reference in its entirety]. The system runs for z=30 years with a 90% availability (f) and the interest rate (i) is considered to be 5% [See: Kabeel A E, Elmaaty T A, El-Said E M S. Economic analysis of a small-scale hybrid air HDH-SSF (humidification and dehumidification-water flashing evaporation) desalination plant. Energy 2013; 53:306-11], incorporated herein by reference in its entirety. The capital costs of the components vary, as shown in Table 2.

TABLE 2

The constructive cost of the hybrid system.

| Component | Annual capital/investment cost |
|---|---|
| Desorbers | $2 \times 2143 \left( \frac{UA_{Desorber}}{0.85} \right)^{0.541}$ |
| Absorber | $2143 \times \left( \frac{UA_{Absorber}}{0.85} \right)^{0.541}$ |
| Heat exchangers | $2 \times 2143 \left( \frac{UA_{HX}}{1.1} \right)^{0.541}$ |
| Condenser | $2143 \times \left( \frac{UA_{Cond}}{1.1} \right)^{0.541}$ |
| Evaporator | $2143 \times \left( \frac{UA_{Evaporator}}{1.1} \right)^{0.541}$ |
| Throttling valves | $114.5 \, (\dot{m}_{10} + \dot{m}_{13} + \dot{m}_{15} + \dot{m}_{18})$ |
| PV and pumping power (annual) | $0.08 \, (W_{Pump\#1} + W_{Pump\#2}) \times f \times 24 \times 365$ |
| Membranes | $36 \times A_{mem}$ |
| DCMD installation | $0.25 \times$ purchased equipment cost |
| Membrane's replacement | $0.20 \times$ purchased equipment cost |
| Water tanks | $11.795 \, \dot{m}_{pw} - 0.000343 \, \dot{m}_{pw}^2$; $\dot{m}_{pw}$ is hourly kg |
| Pipes and fittings | $2.92 \, \dot{m}_{pw}$; $\dot{m}_{pw}$ is hourly kg |
| Accessories | $1.67 \, \dot{m}_{pw}$; $\dot{m}_{pw}$ is hourly kg |
| Control devices | $8.34 \, \dot{m}_{pw}$; $\dot{m}_{pw}$ is hourly kg |

In Table 2, the annual capital/investment cost has been obtained from various references [See: Banat F et al.; Qasem N A A et al.; Rostamzadeh H, Namin A S, Ghaebi H, Amidpour M. Performance assessment and optimization of a humidification dehumidification (HDH) system driven by absorption-compression heat pump cycle. Desalination 2018; 447:84-101; Murphy C, Sun Y, Cole W, Maclaurin G, Turchi C, Mehos M, et al. The potential role of concentrating solar power within the context of DOE's 2030 solar cost targets. 2019; Lawal D U, Antar M A, Khalifa A, Zubair S M, Al-Sulaiman F. Experimental investigation of heat pump driven humidification-dehumidification desalination system for water desalination and space conditioning. Desalination 2020; 475:114199], incorporated herein by reference in their entirety.

Further, herein, the annual capital cost can be calculated by, $$C_F = C_c \times \alpha \qquad (9)$$

where $C_c$ is the overall capital cost which is the total values obtained from equations mentioned in Table 2, and $\alpha$ is the amortization charge, which can be estimated as:

$$\alpha = \frac{i \times (i+1)^z}{(i+1)^z - 1} \qquad (10)$$

The annual cost of natural gas is expressed as, $$C_G = \frac{COG}{293.071} \times \frac{\dot{Q}_{ht}}{\eta_{comb}} \times 24 \times 365 \quad (11)$$

The annual cost of labor ($C_L$), maintenance ($C_M$), and management ($C_{Mg}$) are evaluated by, $$C_L = l \times f \times \frac{\dot{m}_{pw}}{1000} \times 3600 \times 24 \times 365 \quad (12)$$

$$C_M = 0.015 \times C_F \quad (13)$$

$$C_{Mg} = 0.20 \times C_L \quad (14)$$

Thus, the annual total cost in USD ($) is, $$C_T = C_F + C_G + C_M + C_{Mg} + C_L \quad (15)$$

The cost of each product may be evaluated using the corresponding product from the VAR section 100B and the DCMD-Abs section 100A, since the present system 100 generates freshwater and cooling effect. The amount relevant to produced water is calculated using information from Lawal D U et al., $$RUD = \frac{\dot{m}_{pw} h_{fg}}{\dot{Q}_{evaporator} + \dot{m}_{pw} h_{fg}} \quad (16)$$

Hence, the cost of freshwater (in $/m³) is expressed as, $$C_{pw} = RUD \frac{C_T}{f \times \dot{m}_{pw} \times 3600 \times 24 \times 365} \quad (17)$$

And the cooling effect cost (in $/kWh) is, $$C_{cooling} = (1 - RUD) \frac{C_T}{f \times \dot{Q}_{evap} \times 24 \times 365} \quad (18)$$

The model for the double-effect VAR system was previously established. Table A1 presents the model equations.

TABLE A1

The modeling equations of the VAR system. The state numbers are presented in FIG. 1.

| Component | Governing equations |
|---|---|
| Desorber # 1 | $\dot{m}_7 = \dot{m}_8 + \dot{m}_9$ |
| | $(\dot{m}x)_9 = (\dot{m}x)_7$ |
| | $\dot{Q}_{ht} = (\dot{m}h)_9 + (\dot{m}h)_8 - (\dot{m}h)_7$ |
| Desorber # 2 | $\dot{m}_4 + \dot{m}_9 = \dot{m}_{14} + \dot{m}_{12}$ |
| | $(\dot{m}x)_{14} = (\dot{m}x)_4 + (\dot{m}x)_9$ |
| | $\dot{m}_{13} = \dot{m}_8$ |
| | $\dot{Q}_{Des\#2} = \dot{m}_{14}h_{14} + \dot{m}_{12}h_{12} - \dot{m}_4h_4 - \dot{m}_9h_{11} = \dot{m}_8(h_8 - h_{13})$ |
| | $\dot{Q}_{Des\#2} = UA_{Des\#2}\left(\frac{(T_{12} - T_{14})}{\ln\left(\frac{T_{13} - T_{14}}{T_{13} - T_{12}}\right)}\right)$ |
| Solution split | $\dot{m}_1 = \dot{m}_7 + \dot{m}_4$ |
| Absorber | $\dot{m}_1 = \dot{m}_{14} + \dot{m}_{20}$ |

TABLE A1-continued

The modeling equations of the VAR system. The state numbers are presented in FIG. 1.

| Component | Governing equations |
|---|---|
| | $(\dot{m}x)_1 = (\dot{m}x)_{14}$ |
| | $Q_{Abs} = \dot{m}_{14}h_{16} + (\dot{m}h)_{20} - (\dot{m}h)_1 = \dot{m}_{w2}h_{w4} - (\dot{m}h)_{w2}$ |
| | $\dot{Q}_{Abs} = UA_{Abs}\left(\frac{(T_{16} - T_1) - (T_{w4} + T_{w2})}{\ln\left(\frac{T_{16} - T_{w4}}{T_1 - T_{w2}}\right)}\right)$ |
| Weak solution concentration | $x_1 = x_2 = x_3 = x_4 = x_5 = x_6 = x_7$ |
| Strong solution concentration | $x_9 = x_{10} = x_{11}$ |
| | $x_{14} = x_{15} = x_{16}$ |
| Condenser | $\dot{m}_{18} = \dot{m}_{17} + \dot{m}_{12}$ |
| | $\dot{Q}_{cond} = (\dot{m}h)_{17} + (\dot{m}h)_{12} - (\dot{m}h)_{18} = \dot{m}_{a5}(h_{w5} - h_{w3})$ |
| | $\dot{Q}_{Cond} = UA_{Cond}\left(\frac{(T_{w5} - T_{w3})}{\ln\left(\frac{T_{18} - T_{w3}}{T_{18} - T_{w5}}\right)}\right)$ |
| Evaporator | $\dot{m}_{18} = \dot{m}_{19} = \dot{m}_{20}$ |
| | $\dot{Q}_{Evap} = \dot{m}_{19}(h_{20} - h_{19}) = (\dot{m}h)_{21} - \dot{m}_{21}h_{22}$ |
| | $\dot{Q}_{Evap} = UA_{Evap}\left(\frac{(T_{21} - T_{20}) - (T_{22} - T_{19})}{\ln\left(\frac{T_{21} - T_{20}}{T_{22} - T_{19}}\right)}\right)$ |
| HX # 1 | $\dot{Q}_{HX\#1} = \dot{m}_7(h_7 - h_6) = \dot{m}_9(h_9 - h_{10})$ |
| | $\dot{Q}_{HX\#1} = UA_{HX\#1}\left(\frac{(T_9 - T_7) - (T_{10} - T_6)}{\ln\left(\frac{T_9 - T_7}{T_{10} - T_6}\right)}\right)$ |
| HX # 2 | $\dot{Q}_{HX\#2} = \dot{m}_1(h_3 - h_2) = \dot{m}_{14}(h_{14} - h_{15})$ |
| | $\dot{Q}_{HX\#2} = UA_{HX\#2}\left(\frac{(T_{14} - T_3) - (T_{15} - T_2)}{\ln\left(\frac{T_{14} - T_3}{T_{15} - T_2}\right)}\right)$ |
| Pump # 1 | $\dot{W}_{Pump\#1} = \dot{m}_1(h_2 - h_1) = \frac{\dot{m}_1}{\eta\rho_1}(P_m - P_l)$ |
| Pump # 2 | $\dot{W}_{Pump\#2} = \dot{m}_7(h_6 - h_5) = \frac{\dot{m}_7}{\eta\rho_5}(P_h - P_m)$ |
| Throttling valves | $h_{10} = h_{11}$ |
| | $h_{13} = h_{17}$ |
| | $h_{15} = h_{16}$ |
| | $h_{18} = h_{19}$ |
| Water split | $\dot{m}_{w2} = y\dot{m}_{w1}$ & $\dot{m}_{w3} = (1 - y)\dot{m}_{w1}$ |
| | $(\dot{m}h)_{w1} = (\dot{m}h)_{w2} + (\dot{m}h)_{w3}$ |
| Water mixed | $\dot{m}_{w6} = \dot{m}_{w4} + \dot{m}_{w5}$ |
| | $(\dot{m}h)_{w6} = \dot{m}_{w4}h_{w6} + \dot{m}_{w5}h_{w7}$ |

Herein, the system model was run using the engineering equations software, as described above. Further, the DCMD model equations for the mass transfer and heat transfer through the membrane have been adapted from various references [See: Khalifa A, Ahmad H et al.; Qasem N A A, Generous M M et al.; Alkhudhiri A, Darwish N, Hilal N. Membrane distillation: A comprehensive review. Desalination 2012; 287:2-18; Essalhi M, Khayet M. Self-sustained webs of polyvinylidene fluoride electrospun nanofibers at different electrospinning times: 2. Theoretical analysis, polarization effects and thermal efficiency. J Memb Sci 2013; 433:180-91; Andrjesdóttir Ó, Ong C L, Nabavi M, Paredes S, Khalil A S G, Michel B, et al. An experimentally optimized model for heat and mass transfer in direct contact membrane distillation. Int J Heat Mass Transf 2013; 66:855-67; Yun Y, Ma R, Zhang W, Fane A G, Li J. Direct contact membrane distillation mechanism for high concentration NaCl solutions. Desalination 2006; 188:251-62; Martínez-Díez L, Florido-Díaz Fj, Vázquez-González Mi. Study of Polarization Phenomena in Membrane Distillation of Aqueous Salt Solutions. Sep Sci Technol 2000; 35:1485-501; Manawi Y M, Khraisheh M, Fard A K, Benyahia F, Adham S. Effect of operational parameters on distillate flux in direct contact membrane distillation (DCMD): Comparison between experimental and model predicted performance. Desalination 2014; 336:110-20], incorporated herein by reference in their entirety, as illustrated in Table A2 below. All necessary symbols are mentioned in the nomenclature below.

TABLE A2

The governing equations of the DCMD model

| Model | Governing equation |
|---|---|
| Mass transfer through membrane | $J = D_e \times \Delta P_m = D_e \times (P^o_{mf} - P^o_{mp})$ <br> $J = D_e \times (p^o_{mf} a_{wf} x_{wf} - p^o_{mp})$ <br> $a_{wf} = \ln\left(\frac{P^o_{sw}}{P^o_w}\right) = \exp(-4.58180 \times 10^{-4} S - 2.04430 \times 10^{-6} S^2)$ <br> $D_e = \left(\frac{\alpha}{D_k} + \frac{1-\alpha}{D_m}\right)^{-1}$ <br> $D_k = \left(\left(\frac{3\varphi}{2\varepsilon \times d_{pore}}\right) \times \sqrt{\frac{\pi R T_m}{8 M_w}}\right)^{-1}$ <br> $D_M = \frac{M_w \varepsilon P D_{w,a}}{R T_m \varphi P_{air,pore}}$ <br> $\tau = \frac{1}{\varepsilon}$ <br> $PD_{w,a} = 1.895 \times 10^{-5} T_m^{2.072}$ <br> $P_{air,pore} = P_{pore} - P^o_{w,p}$ <br> $P_{pore} = \frac{1}{2} \times (P_f + P_p)$ |
| Heat transfer equations | $q_f = h_f(T_{bf} - T_{mf})$ <br> $q_m = q_{cond} + q_{conv}$ <br> $q_{cond} = \left(\frac{k_m}{\delta}\right) \times (T_{mf} - T_{mp})$ <br> $q_{conv} = J \Delta H_v$ <br> $k_m = \left(\frac{\varepsilon}{k_g} + \frac{1-\varepsilon}{k_{mem}}\right)^{-1}$ <br> $q_p = h_p(T_{mp} - T_{bp})$ <br> $q_f = q_m = q_p$ <br> $T_{mf} = \dfrac{k_m \times \left(T_{bp} + \dfrac{h_f}{h_p} \times T_{bf}\right) + (\delta(h_f T_{bf} - J \Delta H_v))}{k_m + \left(h_f\left(\delta + \dfrac{k_m}{h_p}\right)\right)}$ <br> $T_{mp} = \dfrac{k_m \times \left(T_{bf} + \dfrac{h_p}{h_f} \times T_{bp}\right) + (\delta(h_p T_{bp} + J \Delta H_v))}{k_m + \left(h_p\left(\delta + \dfrac{k_m}{h_f}\right)\right)}$ |

TABLE A2-continued

The governing equations of the DCMD model

| Model | Governing equation |
|---|---|
| | $\beta = \dfrac{C_{mf}}{C_{bf}}$ <br> $C_{mf} = C_{bf} \exp\left(\dfrac{J}{k_s \rho_{bf}}\right)$ <br> $k_s = Sh * \dfrac{D_e}{D_h}$ <br> $Sh = \begin{cases} 1.86\left(\dfrac{Re \times Sc \times D_h}{L}\right)^{0.33} \text{Laminar} \\ 0.023 \ (Re_f)^{-0.8} (Sc)^{0.33} \text{Turbulent} \end{cases}$ <br> $Sc = \dfrac{\mu_{mf}}{\rho_{bf} D_e}$ <br> $h = \dfrac{Nu k}{D_h}$ <br> $Nu = \begin{cases} 1.86\left(\dfrac{Re \times Pr \times D_h}{L}\right)^{0.33} \text{Laminar} \\ 0.027(Re)^{0.8}(Pr)^{0.4}\left(\dfrac{\mu_b}{\mu_m}\right)^{0.14} \text{Turbulent} \end{cases}$ <br> $q_m = U(T_{bf} - T_{bp})$ <br> $U = \left[\dfrac{1}{h_f} + \dfrac{1}{\left(\dfrac{k_m}{\delta}\right) + \dfrac{J \Delta H_v}{(T_{mf} - T_{mp})}} + \dfrac{1}{h_p}\right]^{-1}$ <br> $\dot{Q}_m = n A_{mem} q_m$ <br> $\dot{Q}_{DCMD,useful,i} = A_{mem} \times J \times \Delta H_v$ <br> $\dot{m}_{pw} = n A_{mem} J$ |

Nomenclature

Figure 2A:
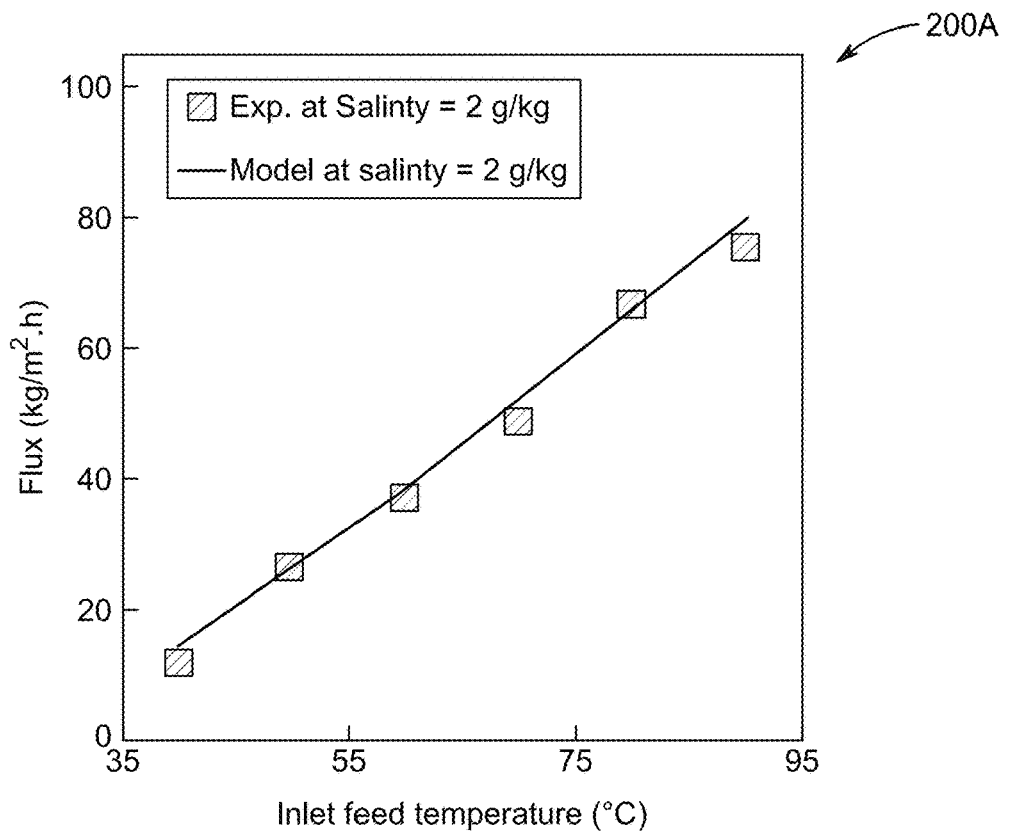
FIG. 2A illustrates a graph depicting validation of a DCMD model against experimental data at a cooling temperature of 25° C. and PTFE-SF17386 (0.45 μm) membrane for salinity at 2 g/kg, according to certain embodiments.
Figure 2B:
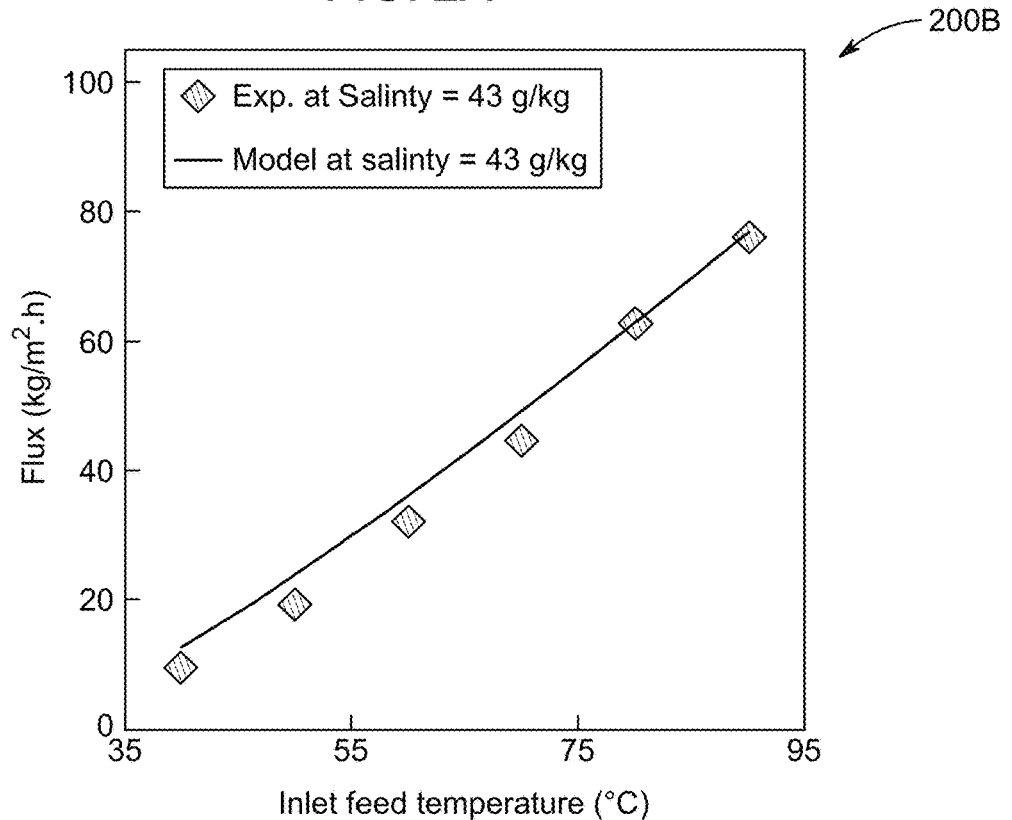
FIG. 2B illustrates a graph depicting validation of the DCMD model against the experimental data at a cooling temperature of 25° C. and PTFE-SF17386 (0.45 μm) membrane for salinity at 43 g/kg, according to certain embodiments.

Symbols $ United States dollar
$\dot{W}$ pumping power, kW
$P_{w,p}^o$ partial pressure of water vapor inside pores, kPa
$\dot{Q}$ heat transfer rate, kW
m mass flowrate, kg/s
a activity coefficient
C concentration, mol/m$^3$
d diameter
$D_e$ effective diffusion coefficient, m$^2$/s
$D_h$ hydraulic diameter, m
$D_k$ Knudsen diffusion coefficient, m$^2$/s
$D_m$ molecular diffusion coefficient, m$^2$/s
f system availability
h specific enthalpy, KJ/kg
i interest rate
J water vapor flux, kg/m$^2$·s
$k_m$ membrane thermal conductivity, kW/m·K
$k_s$ diffusive mass transfer coefficient
L length, m
l operating labor cost, $/m$^3$
$M_w$ molecular weight, kg/kmol
N number of channels in a module
n number of DCMD modules
n system expected life, years
Nu Nusselt number P total pressure, kPa
$P_{air,pore}$ partial pressure of air inside pores, kPa
$PD_{w,a}$ vapor diffusivity through static air inside pores
$P_h$ high pressure, kPa
$P_l$ low pressure, kPa
$P_m$ medium pressure, kPa
$P_{pore}$ total pore pressure, kPa
Pr Prandtl number
q heat transfer per unit area, kW/m²
Re Reynolds number
RUD ratio of water production power to the total power of products
S Salinity, g/kg
Sc Schmidt number
Sh Sherwood number
T temperature, ° C.
U heat transfer coefficient, kW/m²·K
UA overall heat transfer coefficient, kW/K
W width, m
x LiBr concentration, kg/kg
molar fraction y
$\Delta H_v$ latent heat of vaporization, kJ/kg
Greek Symbols
α mass transfer factor/amortization charge
η efficiency
β concentration polarization coefficient
δ thickness, m
ε porosity
φ hypothesis path through the membrane
μ dynamic viscosity, Pa·s
τ tortuosity
ρ density, kg/m³
Subscripts
1, . . . , 22 absorption refrigerator states
w1, . . . , w10 water states
Abs absorber
ch channel
comb combustion
Cond condenser
Des desorber
Evap evaporator
f feed
ht heating source
in inlet
j channel number
m, mem membrane
mf feed at membrane surface
mp permeate at membrane surface
out outlet
p permeate/PORE
pw water production
sat saturated
SW saline water
W water
Superscripts
n years
o vapor state Further, in the present disclosure, the DCMD and VAR system models have been validated and tested against some experimental results reported in the literature. The DCMD model was validated against the data of Khalifa et al. using a PTFE-SF17386 (0.45 μm) membrane at the cooling permeate temperature of 25° C., salinity of 2 g/kg and 43 g/kg, permeate flow rate of 3.65 L/min, and feed flow rate of 4.6 L/min. Referring to FIGS. 2A and 2B, as demonstrated in graphs 200A and 200B, respectively, the DCMD model results are in good match with the experimental data.

Furthermore, in the present disclosure, the significance of different input variables on the performance, including the cooling effect and produced water, as well as the COP, GOR, and EUF have been demonstrated. In addition, cooling and freshwater costs are estimated based on the typical inputs listed in Table 1 unless otherwise stated. Herein, firstly, the effect of input power and the mass flow rate of the solution on performance of the present VAR system 100 (as shown in FIG. 1) is investigated. The mass flow rate (m¹) of 0.5-2.0 kg/s and different input power levels such as 200, 300, 400, and 500 kW are considered.

Figure 3A:
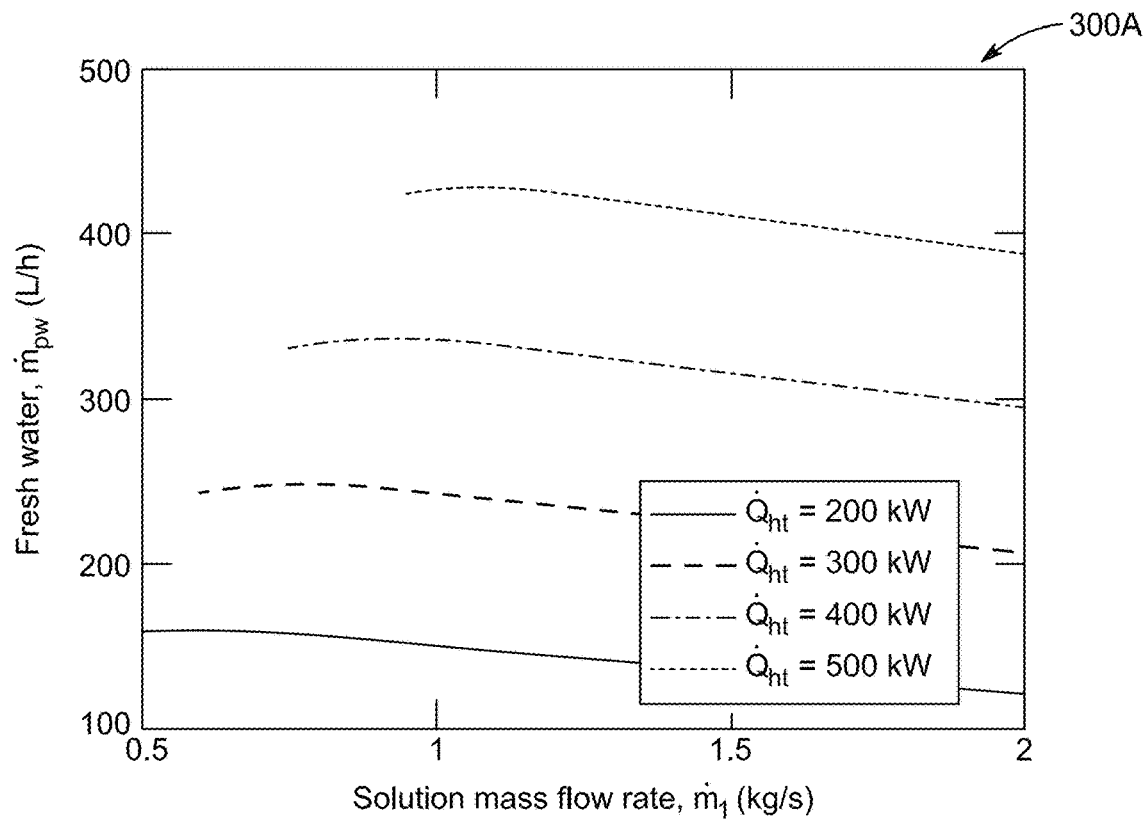
FIG. 3A illustrates a graph depicting performance of the VAR system for hourly produced water against mass flow rate of saline water feed stream and input heat, according to certain embodiments.
Figure 3B:
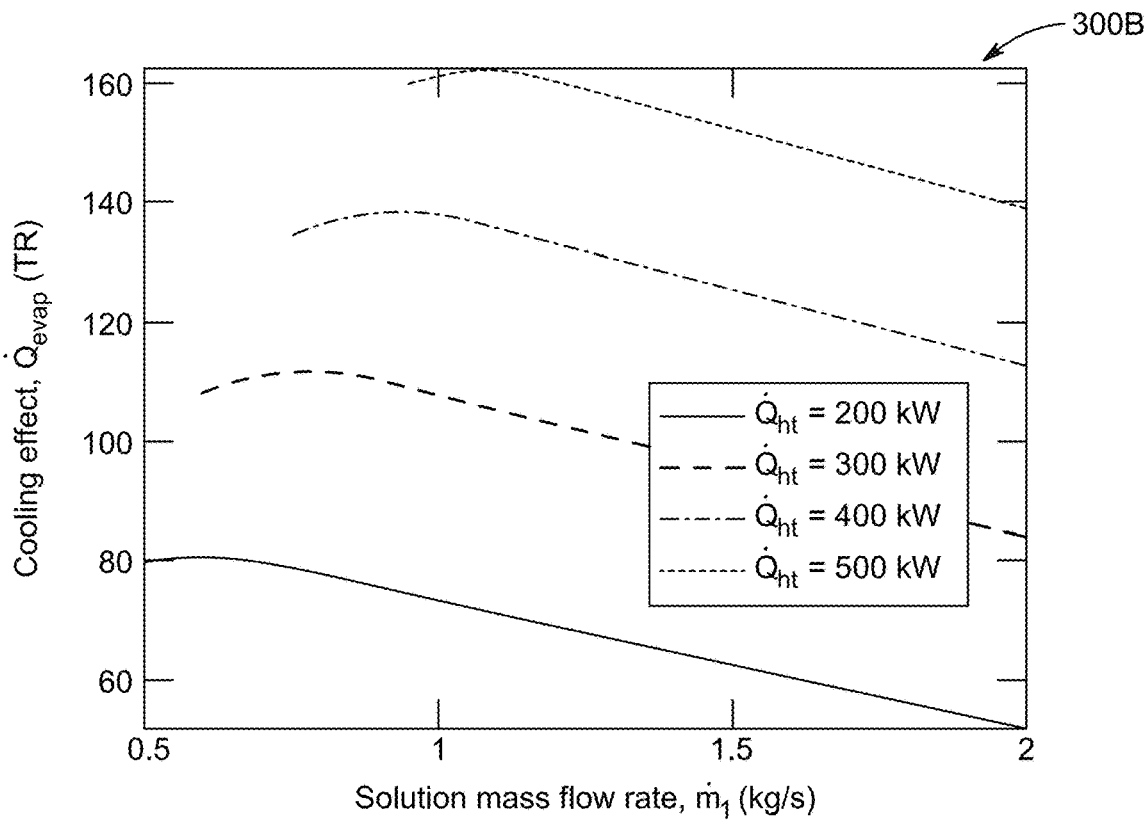
FIG. 3B illustrates a graph depicting performance of the VAR system for cooling effect (TR) against mass flow rate of saline water feed stream and input heat, according to certain embodiments.
Figure 3C:
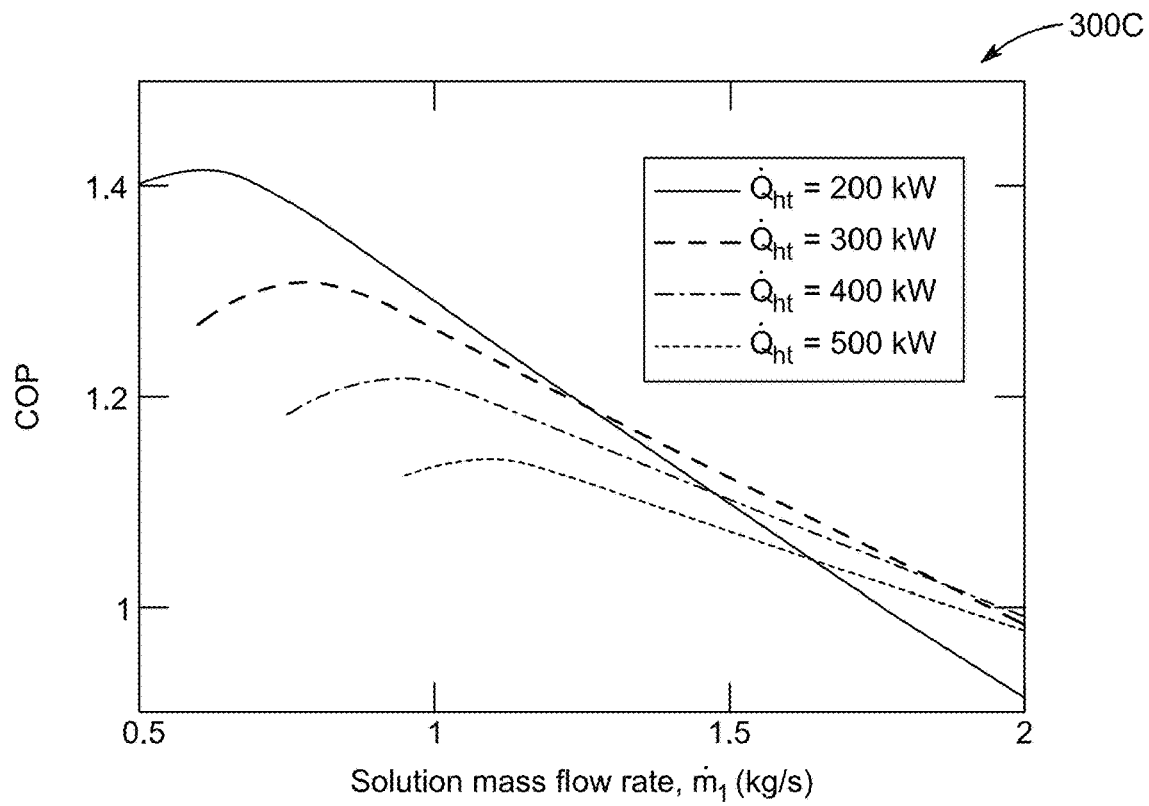
FIG. 3C illustrates a graph depicting performance of the VAR system for coefficient of performance (COP) against mass flow rate of saline water feed stream and input heat, according to certain embodiments.
Figure 3D:
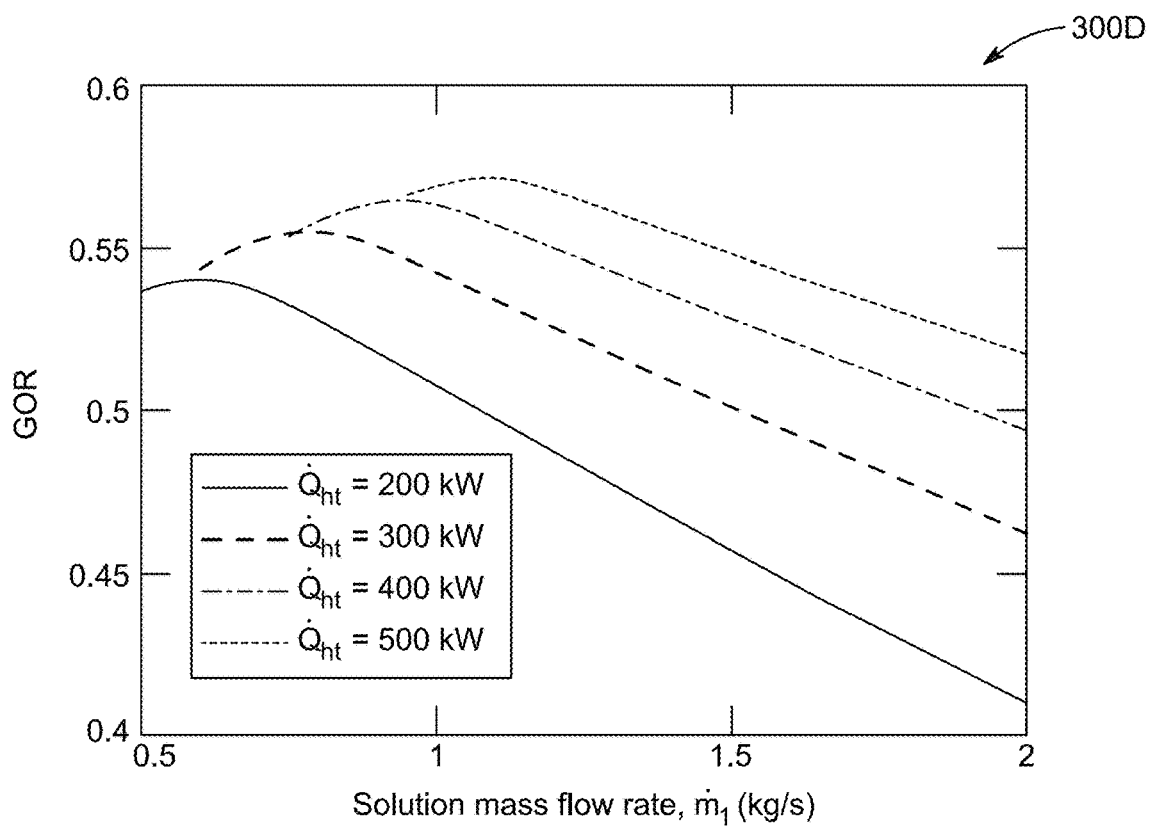
FIG. 3D illustrates a graph depicting performance of the VAR system for gained output ratio (GOR) against mass flow rate of saline water feed stream and input heat, according to certain embodiments.
Figure 3E:
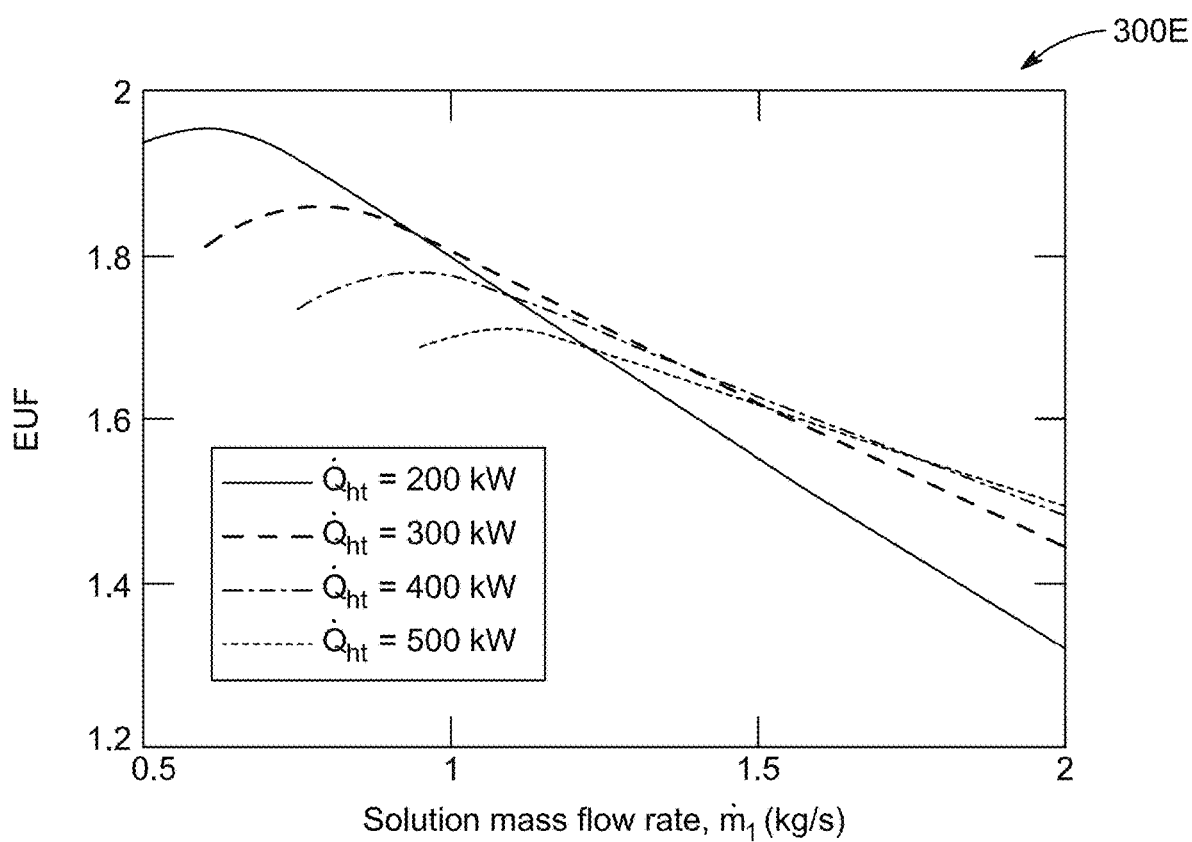
FIG. 3E illustrates a graph depicting performance of the VAR system for energy utilization factor (EUF) against mass flow rate of saline water feed stream and input heat, according to certain embodiments.

Referring to FIGS. 3A-3E, as shown in graphs 300A, 300B, 300C, 300D and 300E, the increase in the input power leads to an increase in the amount of freshwater produced, cooling effect, and GOR. For example, at an input power of 500 kW, the freshwater productivity, cooling effect, and GOR achieve maximum values of 492.1 L/h, 162.4 TR, and 0.57, respectively. However, at 200 kW, they have the lowest performance values of 160.8 L/h, 80.6 TR, and 0.54, respectively. In addition, the decrease in the input power with increasing the mass flow rate in the VAR section 100A can reduce the DCMD-Abs section 100B performance. This is because of minimizing the heating process of the solution inside the desorbers and the water vapor reduction, which powers the DCMD-Abs section 100B. In contrast, the graphs 300C and 300E of FIGS. 3C and 3E show that the decrease in input power with the increase in the solution mass flow rate raise the values of COP and EUF. For instance, at 200 kW, the COP and EUF achieve optimum values of 1.42 and 1.96, respectively; however, at the maximum input power (500 kW), their values are 1.14 and 1.71, respectively. Herein, the EUF represents performance of the entire system 100 and suggests lower input power. In general, FIGS. 3A-3E suggest that large heating levels favor the water production system, whereas low heating values favor the cooling system. If water productivity is of prime importance, an input power of 400 kW can provide good water production (while also providing good cooling capacity). For example, at $\dot{m}_1$=0.98 and input power of 400 kW, freshwater production, cooling effect, COP, GOR, and EUF are 338.0 L/h, 138.6 TR, 1.218, 0.565, and 1.78, respectively.

Also, since the DCMD feed mass flow rate is used to cool the absorber 104 and the condenser 102 of the VAR system 100, it may be critical to determine the influence of feed flow rate on performance. This investigation of the total feed mass flow rate ($\dot{m}_f=\dot{m}_{w1}$) versus the absorber feed water ratio occurs under the absorption mass flow rate of $\dot{m}_1$=0.98 kg/s and an input power of 400 kW. For all performance indices, raising the feed water absorber fraction up to 60% improves performance, but thereafter performance declines, indicating that heat quantity of the absorber 104 is greater than the condenser 102, requiring more cooling water in the absorber 104. As a result, the system 100 performs well when 60% or little more of the total feed water is utilized to cool the absorber 104.

Figure 4A:
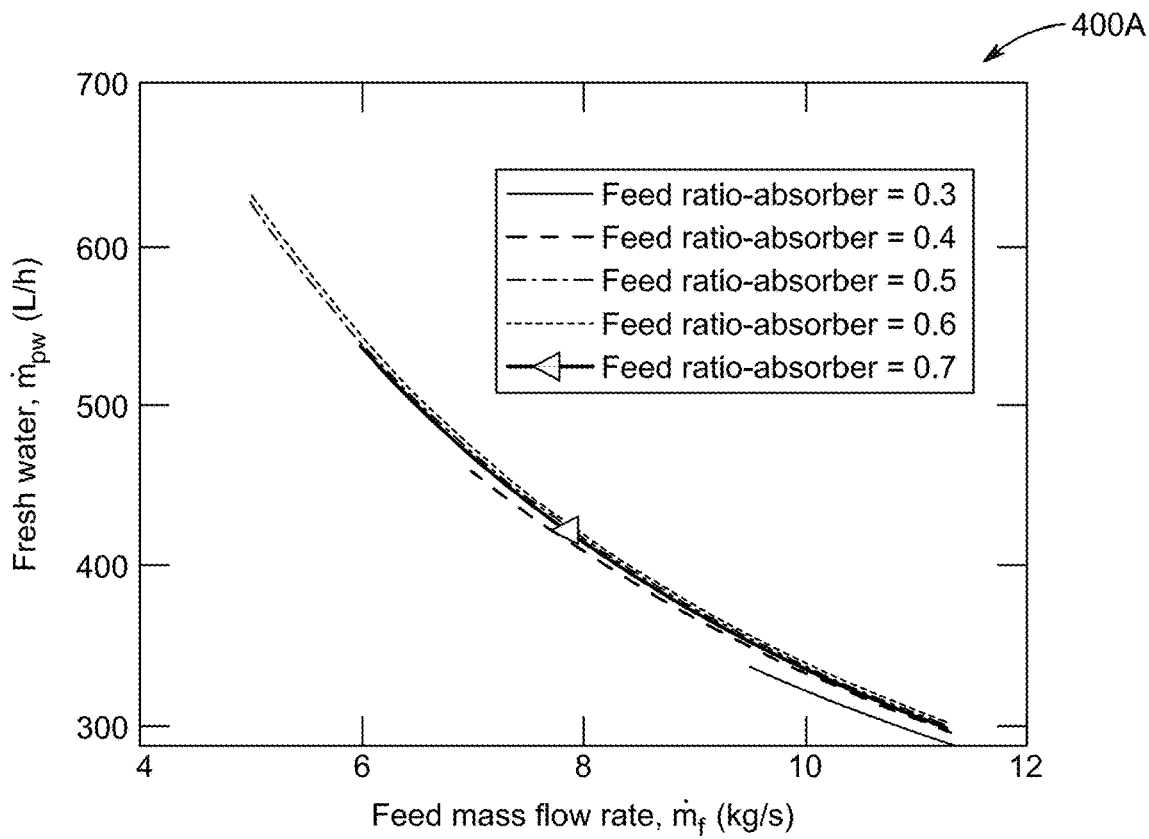
FIG. 4A illustrates a graph depicting performance of the VAR system for hourly produced water against mass flow rate of saline water feed stream and its ratio that goes to absorber, according to certain embodiments.
Figure 4B:
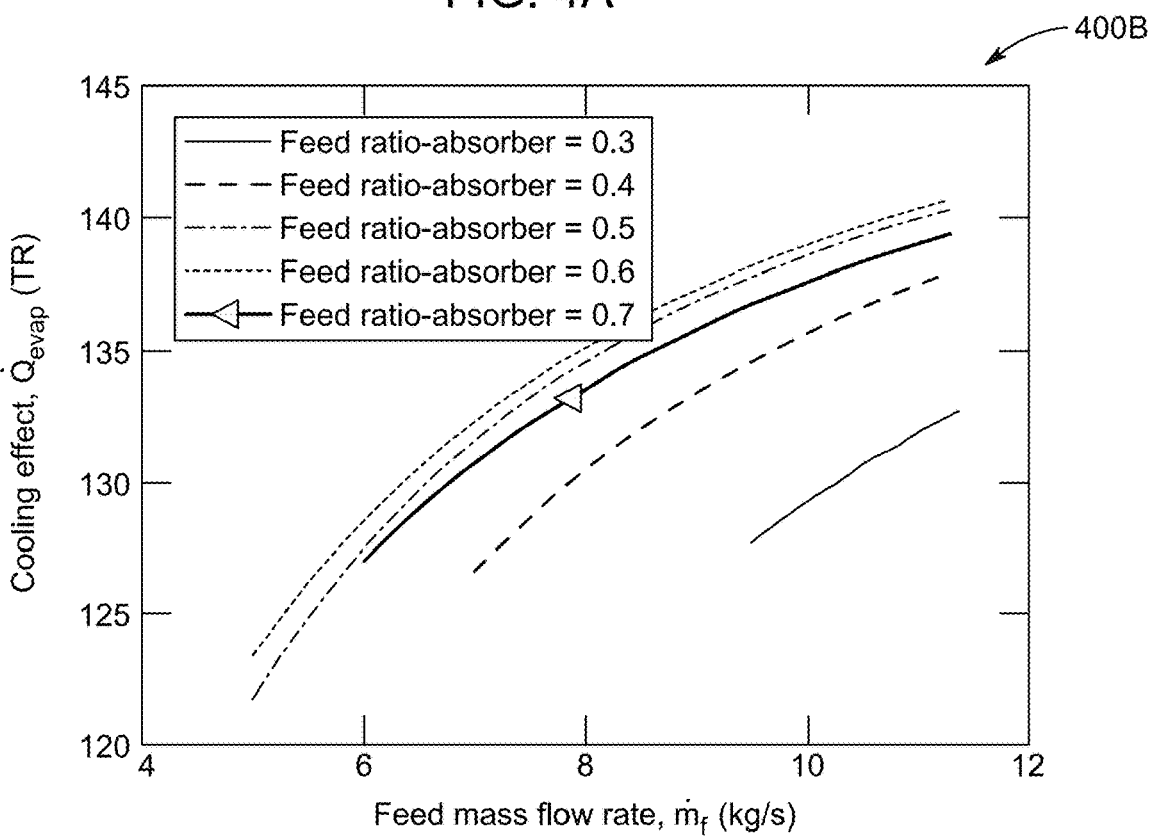
FIG. 4B illustrates a graph depicting performance of the VAR system for cooling effect (TR) against mass flow rate of saline water feed stream and its ratio that goes to absorber, according to certain embodiments.
Figure 4C:
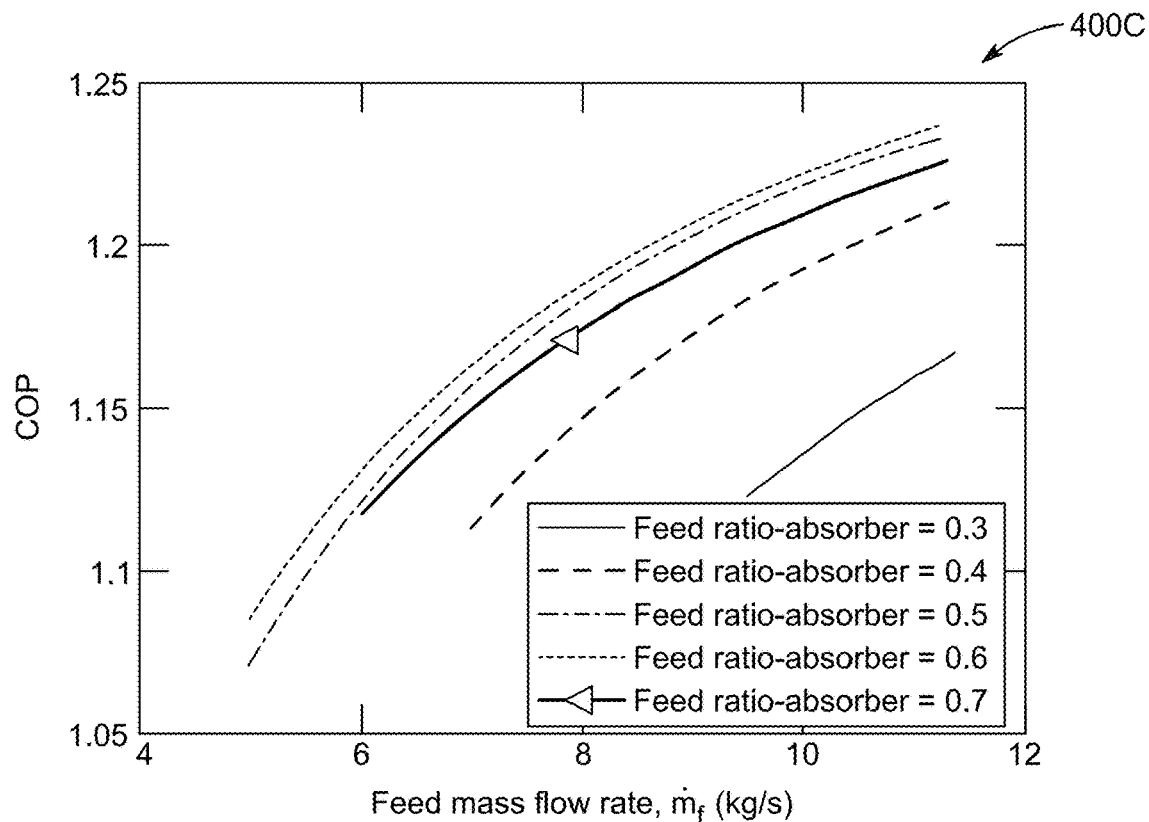
FIG. 4C illustrates a graph depicting performance of the VAR system for coefficient of performance (COP) against mass flow rate of saline water feed stream and its ratio that goes to absorber, according to certain embodiments.
Figure 4D:
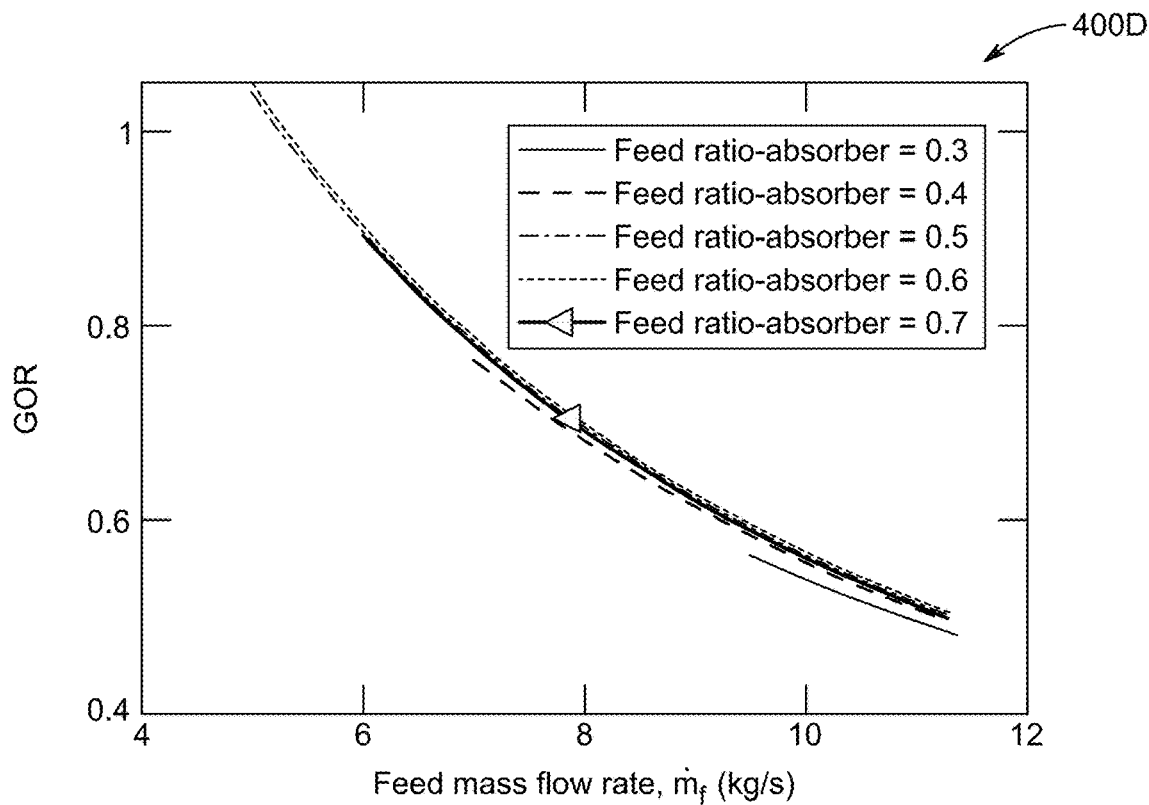
FIG. 4D illustrates a graph depicting performance of the VAR system for gained output ratio (GOR) against mass flow rate of saline water feed stream and its ratio that goes to absorber, according to certain embodiments.
Figure 4E:
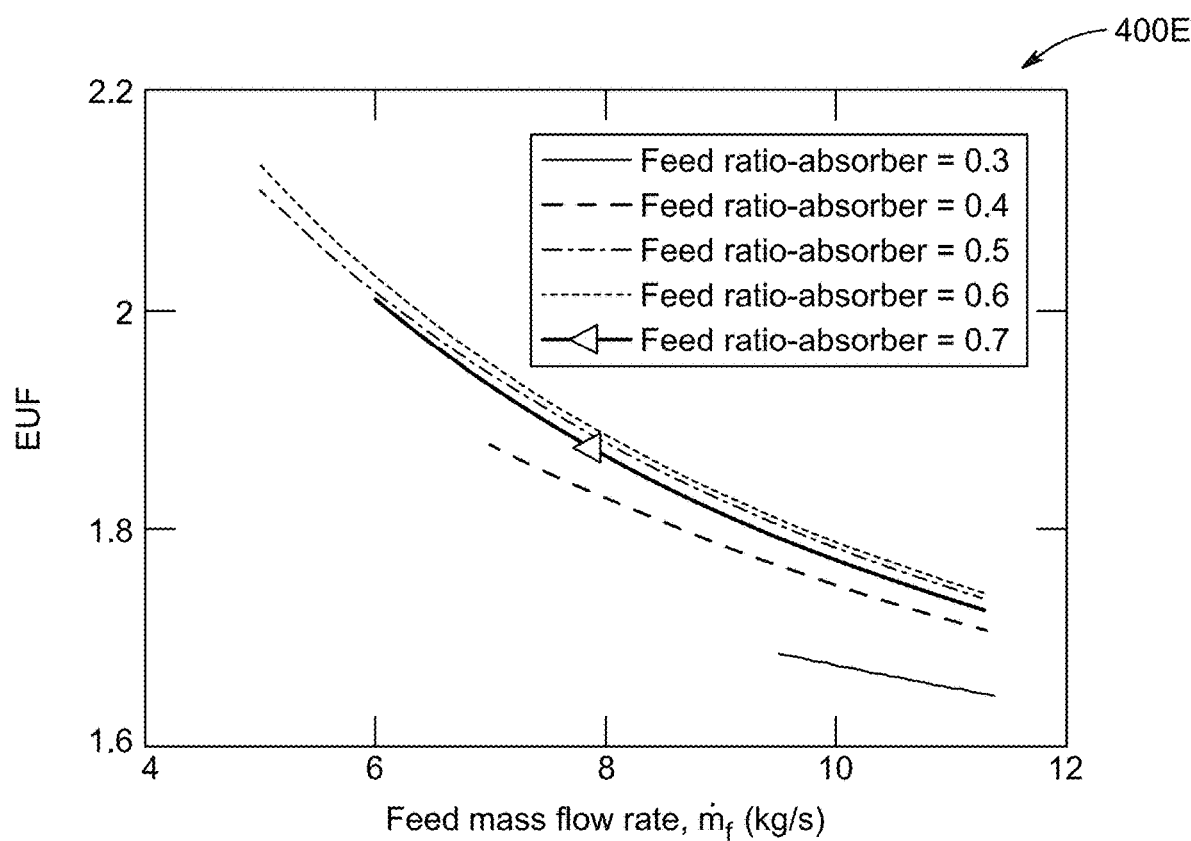
FIG. 4E illustrates a graph depicting performance of the VAR system for energy utilization factor (EUF) against mass flow rate of saline water feed stream and its ratio that goes to absorber, according to certain embodiments.

Referring to FIGS. 4A, 4D and 4E, corresponding graphs 400A, 400D and 400E indicate that the productivity of freshwater, GOR, and EUF achieve optimal performance at a low feed mass flow rate. For instance, at $\dot{m}_f$=5 kg/s and feed ratio absorber of 0.6, the amount of freshwater produced, GOR, and EUF are 632.8 L/h, 1.09, and 2.13, respectively. The cooling effect and COP decrease for low total feed mass flow rates due to the VAR system's cooling process being minimized. Further, as indicated in graphs 400B and 400C of FIGS. 4B and 4C, the cooling capacity indicates a low value of 123.4 TR (COP=1.05) at $\dot{m}_f$=5 kg/s and 60% of feed water going to absorber 104. However, the optimal values of cooling effect and COP are 140.8 TR and 1.24, respectively, at a total feed ('W1') mass flow rate of 11.4 kg/s.

Further, the present disclosure discusses the influence of permeate channels' mass flow rate ($\dot{m}_p$) on performance of the system 100. Also, some salinity values are introduced to investigate the performance of different saline water sources. Different input parameters are used, such as an input power $\dot{Q}_{ht}$=400 kW, mass flow rate of 0.98 kg/s, $\dot{m}_f$=5 kg/s and 60% of the feed ratio.

Figure 5A:
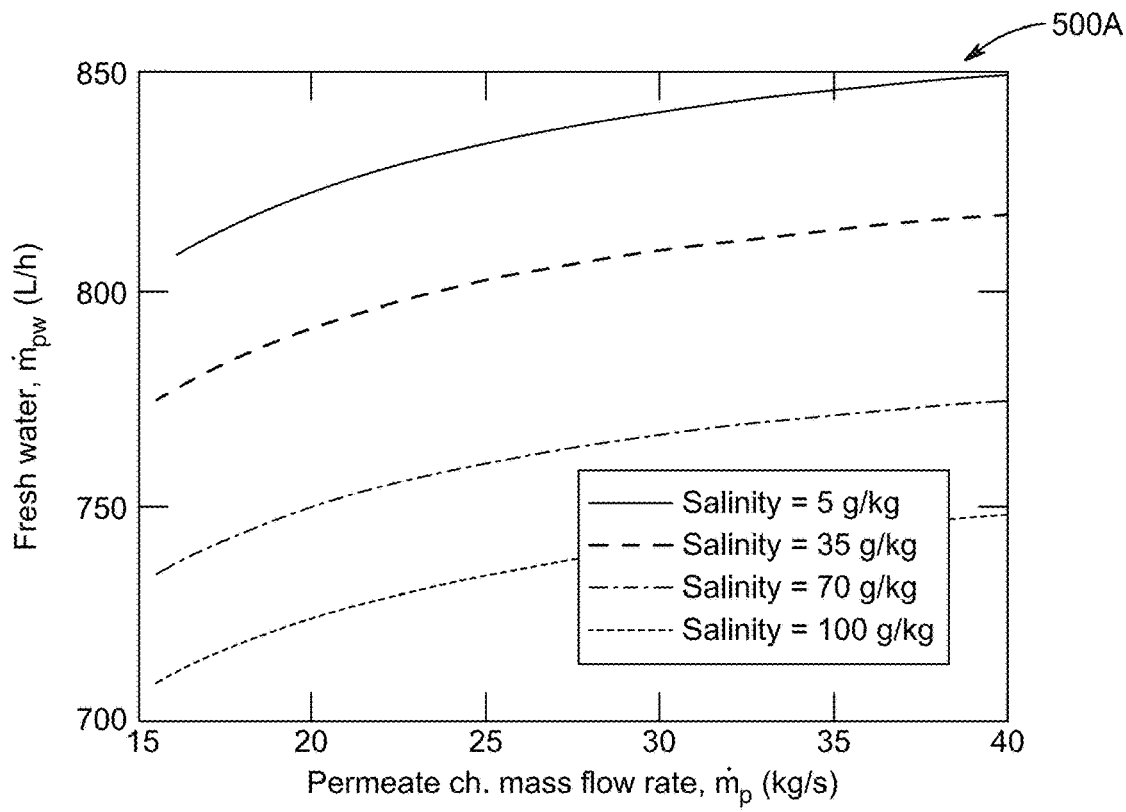
FIG. 5A illustrates a graph depicting performance of the VAR system for hourly produced water against mass flow rate of saline water feed stream through permeate channels of DCMD-Abs section and salinity of saline water feed stream, according to certain embodiments.
Figure 5B:
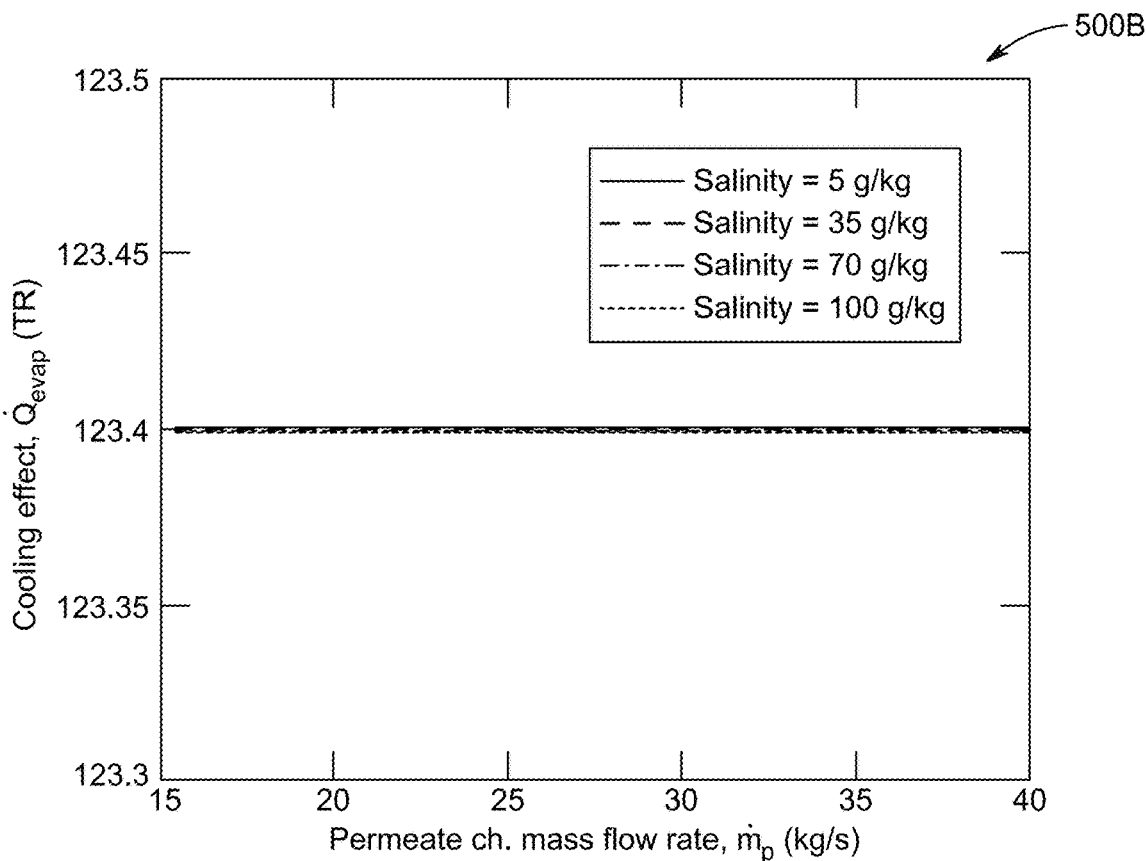
FIG. 5B illustrates a graph depicting performance of the VAR system for cooling effect (TR) against mass flow rate of saline water feed stream through permeate channels of DCMD-Abs section and salinity of saline water feed stream, according to certain embodiments.
Figure 5C:
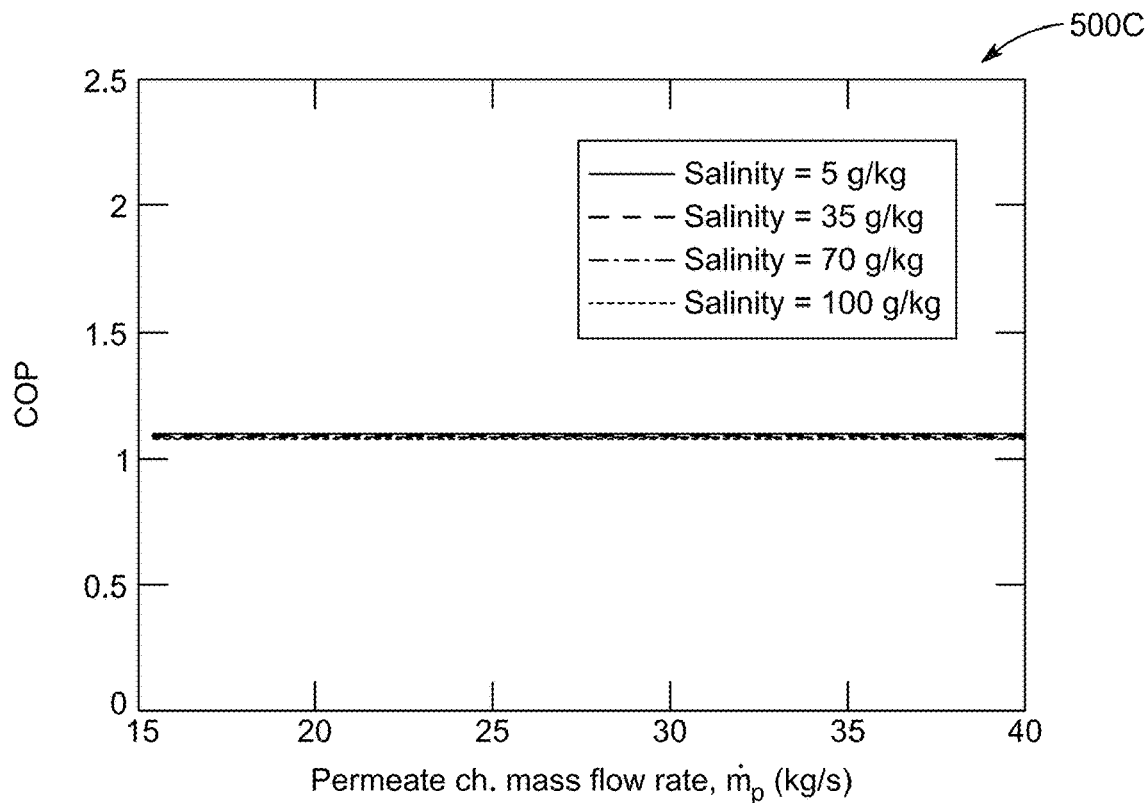
FIG. 5C illustrates a graph depicting performance of the VAR system for coefficient of performance (COP) against mass flow rate of saline water feed stream through permeate channels of DCMD-Abs section and salinity of saline water feed stream, according to certain embodiments.
Figure 5D:
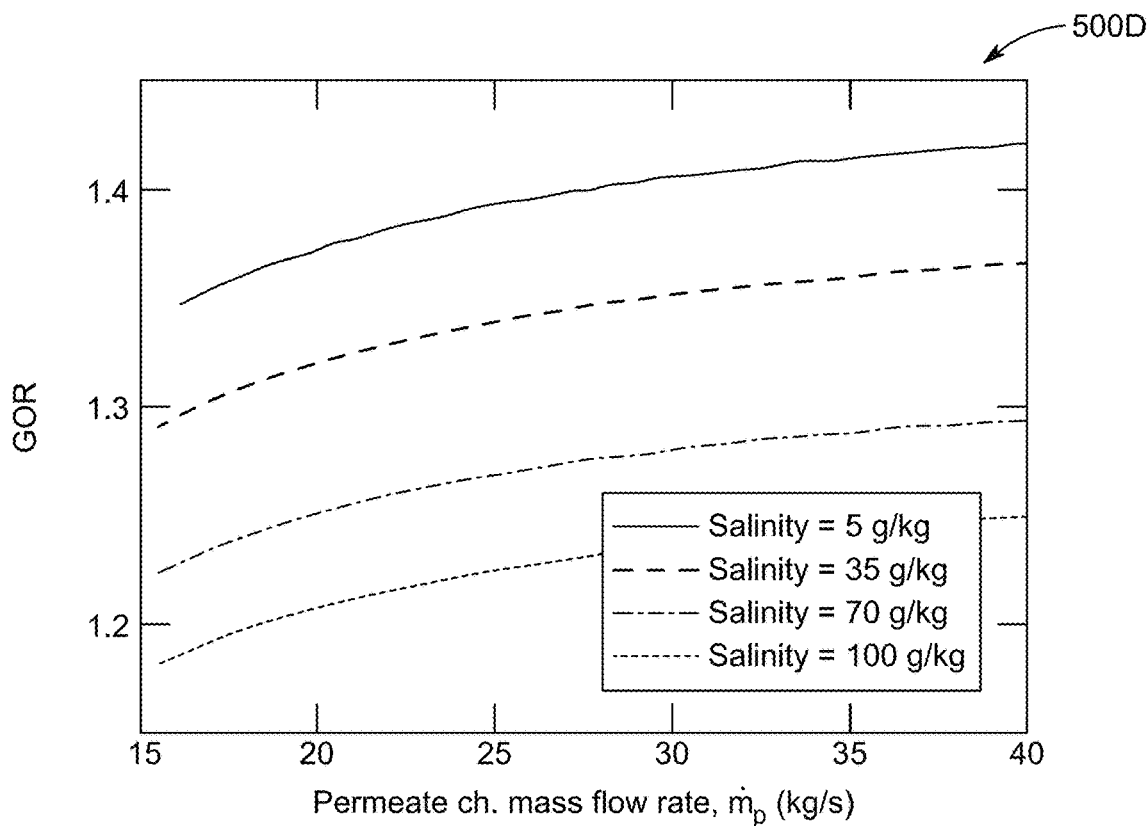
FIG. 5D illustrates a graph depicting performance of the VAR system for gained output ratio (GOR) against mass flow rate of saline water feed stream through permeate channels of DCMD-Abs section and salinity of saline water feed stream, according to certain embodiments.
Figure 5E:
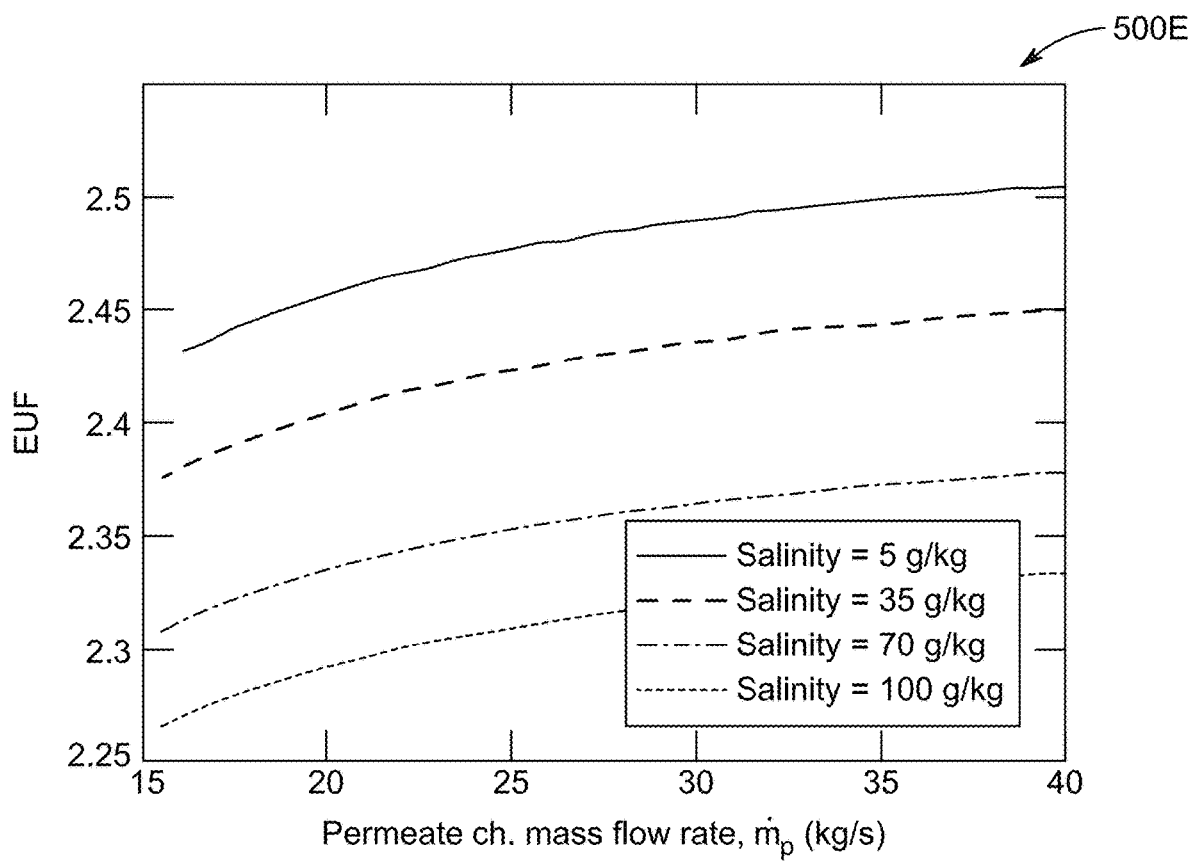
FIG. 5E illustrates a graph depicting performance of the VAR system for energy utilization factor (EUF) against mass flow rate of saline water feed stream through permeate channels of DCMD-Abs section and salinity of saline water feed stream, according to certain embodiments.
Figure 6A:
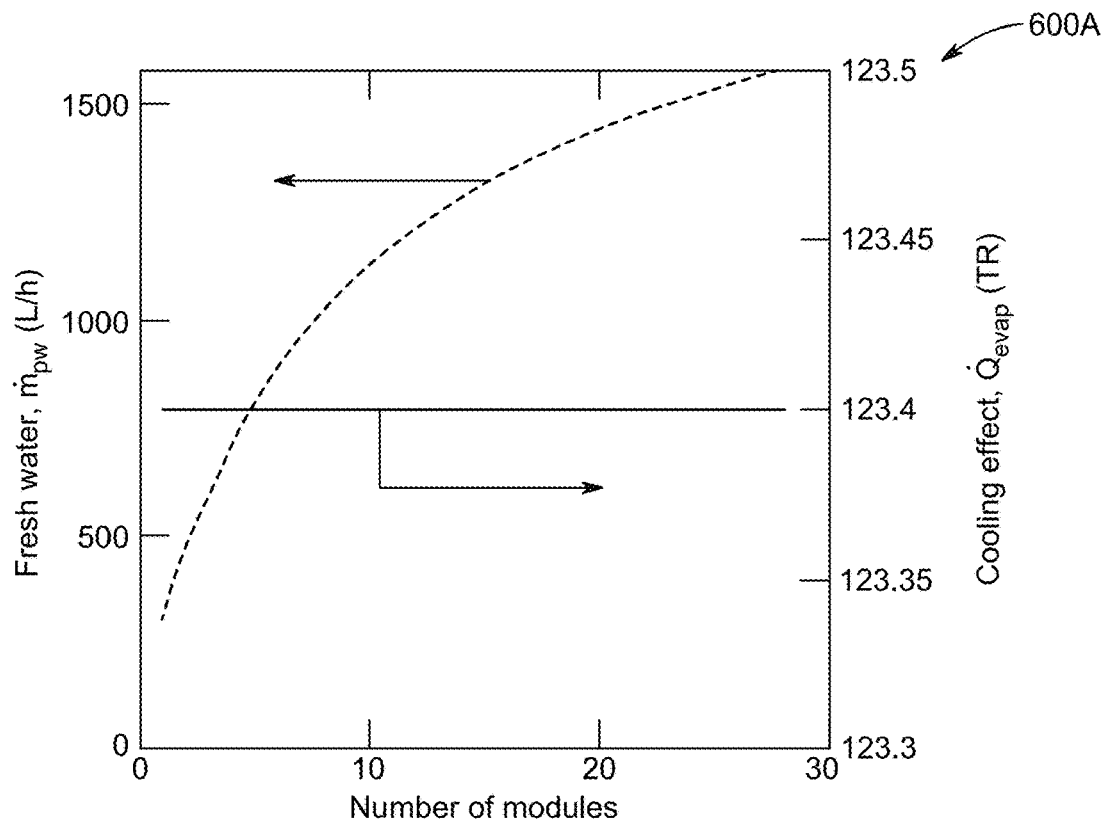
FIG. 6A illustrates a graph depicting performance of the VAR system for hourly produced water and cooling capacity against number of DCMD-Abs modules, according to certain embodiments.
Figure 6B:
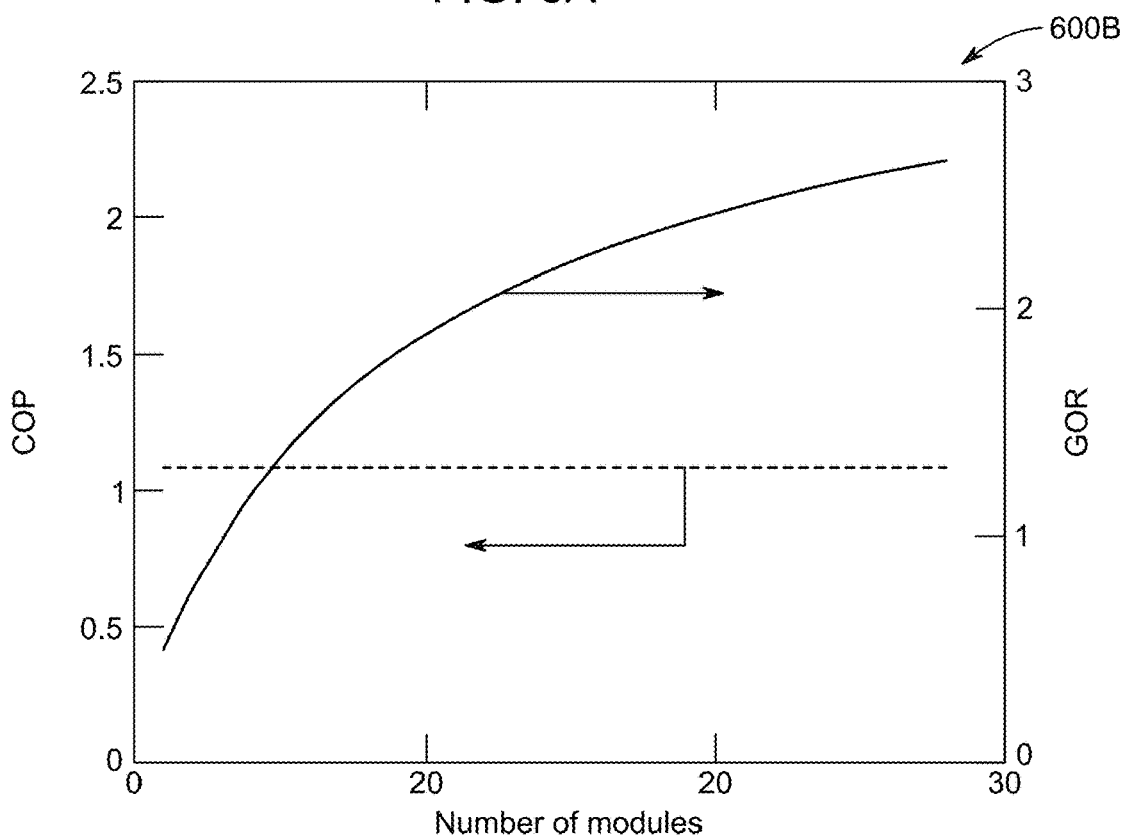
FIG. 6B illustrates a graph depicting performance of the VAR system for COP and GOR against number of DCMD-Abs modules, according to certain embodiments.
Figure 6C:
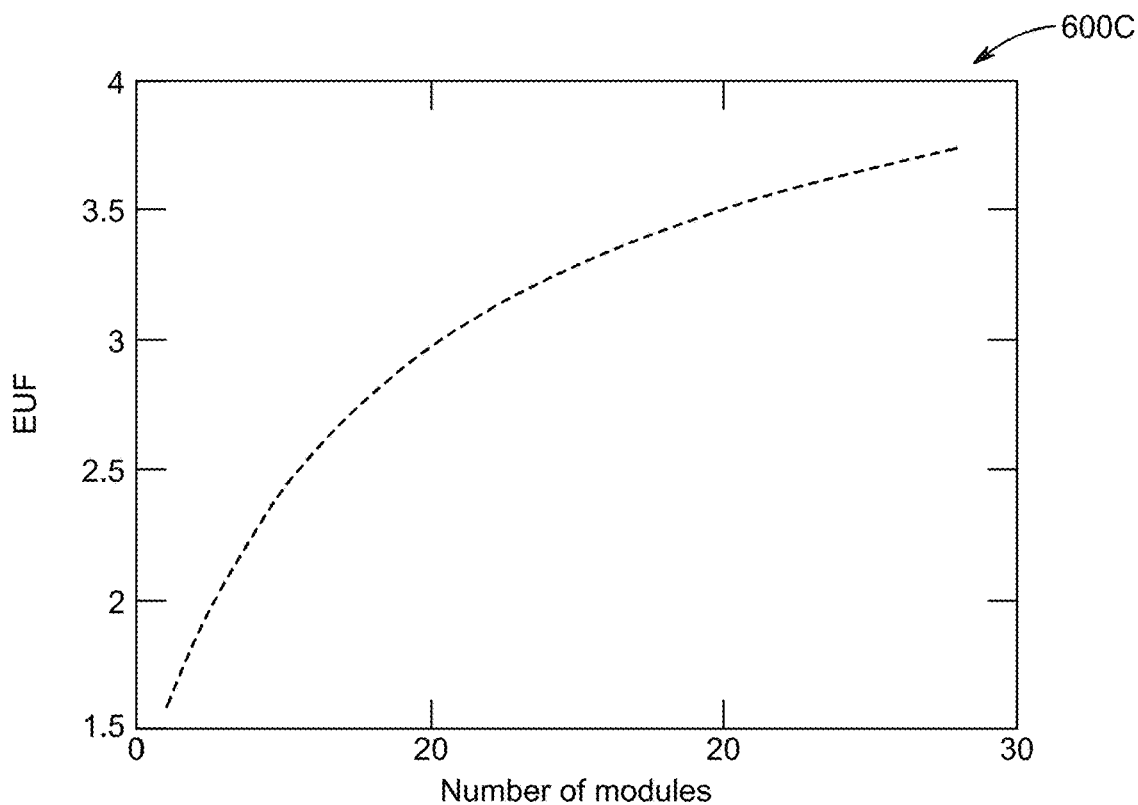
FIG. 6C illustrates a graph depicting performance of the VAR system for EUF against number of DCMD-Abs modules, according to certain embodiments.
Figure 6D:
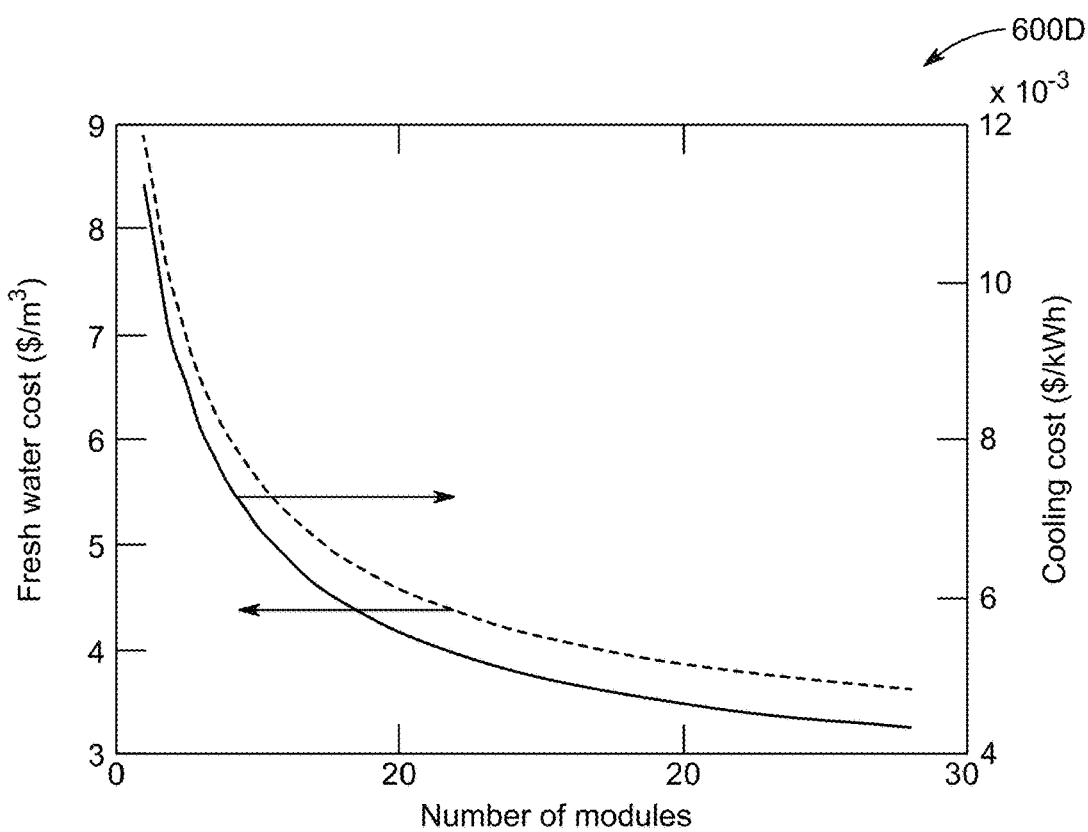
FIG. 6D illustrates a graph depicting performance of the VAR system for cost of produced water and cooling effect against number of DCMD-Abs modules, according to certain embodiments.

Referring to FIGS. 5A, 5D and 5E, corresponding graphs 500A, 500D and 500E indicate that the increase in permeate mass flow rate with lower salinity value improves the productivity of freshwater, GOR, and EUF. For example, at a salinity of 5 g/kg and $\dot{m}_p$ of 40 kg/s, the amount of freshwater is 850.7 L/h, GOR is 1.42, and EUF is 2.51. Further, as indicated in graphs 500B and 500C of FIGS. 5B and 5C, no changes in the performance of COP or the cooling effect occur. This is because the cooling mechanism in the DCMD-Abs section 100B is separated from the VAR section 100A, in the present system 100.

as RUD rises. In general, these enhancements in performance of the system 100 are the result of increasing the area of the membranes 156 to create more water and magnifying useable power of the DCMD-Abs section 100B in the system 100.

The present disclosure further provides a comparison between the present integrated system 100 and standalone systems as known in the art. Based on experiments, the present integrated system 100 produces 1443 L/h of freshwater, 1.09 COP, 123.4 TR of cooling capacity, 2.42 GOR, 3.050 EUF, 3.87 $/m³ water cost, and 0.0047 $/kWh cooling cost. Typical input parameters have been used for measuring performance of the present system 100, including $\dot{m}^1$ of 0.98, and 400 kW of $\dot{Q}_{ht}$. Also, $T_{f(w1)}$ was 25° C., and the $T_{p(w8)}$ was 25° C., and the values of permeate water mass flow rate $\dot{m}_p$, absorber mass flow rate ratio, and $\dot{m}_f$ were 40 kg/s, 0.6, and 5 kg/s respectively. The number of modules was 20, and the salinity was 35 g/kg. The tested system 100 utilized membrane PVDF ENMs. Moreover, the system 100 is tested for the multistage-parallel DCMD at optimal operating conditions (the same above conditions except for $\dot{m}_p$=30 kg/s). The performance is listed in Table 3.

TABLE 3

Comparison of the hybrid system performance with standalone DCMD and standalone VAR systems.

| System | Freshwater production, L/h | Cooling capacity, TR | GOR | COP | EUF | Freshwater cost, $/m³ | Cooling effect cost, $/kWh |
|---|---|---|---|---|---|---|---|
| Integrated system (series DCMD) | 1443 | 123.4 | 2.42 | 1.09 | 3.50 | 3.87 | 0.0047 |
| Standalone DCMD | 589.2 | — | 0.96 | — | 0.96 | 11.53 | — |
| Standalone double-effect VAR system | — | 134.8 | — | 1.247 | 1.247 | — | 0.0150 |
| Integrated system (parallel DCMD) | 1315 | 123.4 | 2.20 | 1.08 | 3.28 | 4.09 | 0.0052 |
| DCMD-VCR system parallel DCMD) | 5.310 | 1.850 | — | — | — | 0.50-2.0 | — |
| Solar-driven DCMD | 2.08 | — | — | — | — | 10.0-15.0 | — |
| Solar-driven DCMD | 0.42 | — | — | — | — | 21.0 | — |

Referring to FIGS. 6A-6D, the effect of number of DCMD-Abs modules 150 is demonstrated. As depicted in graphs 600A, 600B, 600C and 600D, adding more modules improves performance of the DCMD-Abs section 100B. Even though the temperature difference decreases from one DCMD-Abs module to the next one, the performance rises due to keeping high flow velocity through all DCMD-Abs modules 150, unlike the parallel connections. The incremental performance, as shown in the graphs 600A, 600B, 600C and 600D, is not linear due to the adverse impacts of reducing temperature differences (between hot and cold channels) from one DCMD-Abs module to the next one, lowering the heat transfer rates. In this regard, the number of DCMD-Abs modules 150 of 20 may be selected to reflect the performance of the present system 100. For example, with module number=20, the DCMD-Abs section 100B produces 1443 L/h of water at a 2.42 GOR and a $3.87 per m³ water cost. The COP and cooling effect stay constant, but EUF rises to 3.50, and the cooling cost falls to 0.0047 $/kWh It may be noted that for Table 3, the values for the Integrated system (parallel DCMD) have been obtained from Qasem N A A, Lawal D U et al.; the values for the DCMD-VCR system parallel DCMD) have been obtained from Khalifa A et al.; the values for first of the two Solar-driven DCMD have been obtained from Fane A G et al. [See: Fane A G, Schofield R W, Fell C J D. The efficient use of energy in membrane distillation. Desalination 1987; 64:231-43, incorporated herein by reference in its entirety]; and the values for second of the two Solar-driven DCMD have been obtained from Karanikola V et al. [See: Karanikola V, Moore S E, Deshmukh A, Arnold R G, Elimelech M, Sáez A E. Economic performance of membrane distillation configurations in optimal solar thermal desalination systems. Desalination 2019; 472:114164, incorporated herein by reference in its entirety].

It may be seen from values of Table 3 that the present series-multistage DCMD-VAR system 100 performs better than the parallel-multistage one and the standalone DCMD system. The present system 100 outperforms the standalone DCMD system in terms of water productivity by 2.45 times, GOR by 2.52 times, EUF by 3.65 times, and freshwater cost reduction by 2.98 times. The present system 100 may reduce cooling capacity and COP by 0.92 and 0.87 times, respectively, compared to a standalone double-effect VAR system while significantly increasing cooling cost reduction by 2.88 times. The present system 100 also shows better performance than those reported in the literature, especially when the two products (freshwater and cooling capacity) are considered.

The present disclosure provides the integration of the double-effect VAR section 100A with the series-multistage DCMD-Abs section 100B. The VAR section 100A works as a refrigerator to provide cooling and also acts as a heat pump to power the DCMD-Abs section 100B via the absorber 104 and condenser 102 thereof. Based on the operating parameters applied in the present disclosure, the results suggested that the freshwater production, cooling capacity, and GOR increase as the input power increases, while the GOR decreases with increasing input power. The solution mass flow rate of the absorption system has an optimal value of 0.98 kg/s (weak solution). The performance of the present integrated system 100 is influenced by the mass flow rate of the saline water feed stream 'W1' (which is split to cool the condenser 102 and the absorber 104) before being passed to the DCMD-Abs section 100B. It is suggested that 60% of the saline water feed stream 'W1', as the saline water feed stream 'W2' may be used to cool the absorber 104, which has a larger thermal load than the condenser 102. Further, the best performance is determined to be 1443 L/h, 123.4 TR, 1.09, 2.42, and 3.50 for freshwater production, cooling capacity, COP, GOR, and EUF, respectively. The lowest cost is found to be 3.87 $/m$^3$ for freshwater and 0.0047 $/kWh for cooling effect. These values are about three times greater than those of the standalone DCMD system. Cooling capacity and COP are lowered by 0.92 and 0.87 times, respectively, compared to a standalone double-effect VAR system; nevertheless, the cooling cost is reduced by 2.88 times.

It may be noted that VCR systems have been exploited more than others to power DCMD systems by heating saline water or circulated air, due to the fact that VCR systems have a higher coefficient of performance (COP). However, despite the fact that the VCR systems have a higher COP, the VAR systems have an advantage that those may be driven by thermal energy sources and use environmentally-friendly refrigerants (e.g., lithium bromide), and they discard heat from two components (condenser and absorber). Since the VAR system expels heat from its condensers, absorbers, generally both, this waste heat may be used to drive the DCMD section efficiently. These features of the VAR systems make them best-suited to drive the DCMD section.

Figure 7:
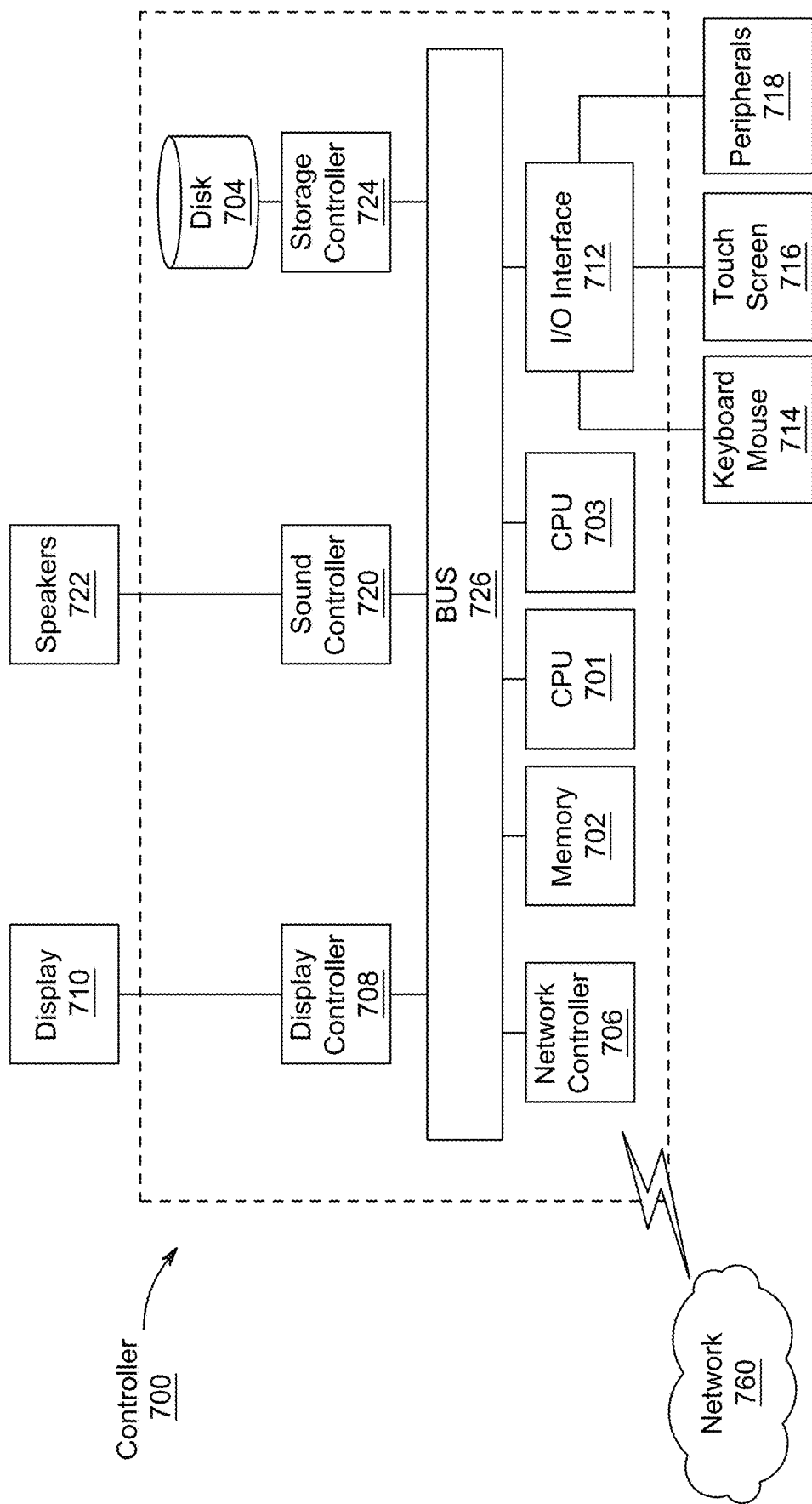
FIG. 7 is an illustration of a non-limiting example of details of computing hardware used in the computing system, according to certain embodiments.

Next, further details of hardware description of a controller 700 which may be implemented to control various functions and operation of the present system 100 according to exemplary embodiments is described with reference to FIG. 7. In FIG. 7, the controller 700 is described which is representative of a computing environment in which the controller 700 (also sometimes referred to as computing device) includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The controller 700 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, the display controller 708, storage controller 724, network controller 706, and the sound controller 720 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A common housing vapor-absorption refrigeration (VAR) system, comprising:
   a condenser;
   an absorber;
   an evaporator;
   a first desorber and a second desorber;
   a first heat exchanger and a second heat exchanger;
   wherein the absorber, the first desorber, the second desorber, the first heat exchanger, the second heat exchanger, and the condenser are housed within the same housing;
   at least four throttling valves;
   at least two pumps; and
   a direct contact membrane distillation-absorber (DCMD-Abs) section, wherein the DCMD-Abs section comprises:
   a saltwater feed compartment and a water compartment, wherein the saltwater feed compartment and the water compartment are separated by a membrane, wherein the membrane permits water vapor to pass from the saltwater feed compartment to the water compartment, wherein the water compartment includes a DCMD condenser to condense the water vapor passing through the membrane; wherein:
   the absorber is in fluid communication with the second heat exchanger and configured to pass a solution from the absorber to the second heat exchanger via a second pump;
   the second heat exchanger is in fluid communication with the first heat exchanger and configured to pass the solution from the second heat exchanger to the first heat exchanger via a first pump;
   the first heat exchanger is in fluid communication with the first desorber and configured to pass the solution from the first heat exchanger to the first desorber to heat the solution in the first desorber with a heater;
   the first desorber is in fluid communication with the first heat exchanger and configured to return a first separated desorber stream to the first heat exchanger;
   the first desorber is in fluid communication with the second desorber and configured to pass a second separated desorber stream to the second desorber;
   the first heat exchanger is in fluid communication with the condenser and configured to pass the first separated desorber stream from the first heat exchanger to the condenser via a first throttling valve of the at least four throttling valves;
   the second desorber is in fluid communication with the condenser and configured to pass the second separated desorber stream from the second desorber to the condenser via a second throttling valve of the at least four throttling valves;
   the second desorber is in fluid communication with the second heat exchanger and configured to pass a first heat exchanger stream from the second desorber to the second heat exchanger;
   the second heat exchanger is in fluid communication with the absorber and configured to pass the first heat exchanger stream from the second heat exchanger to the absorber via a third throttling valve of the at least four throttling valves;
   the condenser is in fluid communication with the DCMD-Abs section and configured to pass a first stream from the condenser to the DCMD-Abs section to produce water;
   the condenser is in fluid communication with the evaporator and configured to pass a rejected DCMD-Abs stream from the condenser to the evaporator via a fourth throttling valve of the at least four throttling valves; and
   the absorber is in fluid communication with the DCMD-Abs section and configured to pass a second stream from the absorber to the DCMD-Abs section to produce water.

2. The system of claim 1, wherein the saltwater feed compartment of the DCMD-Abs section is in fluid communication with the water compartment of the DCMD-Abs section by passing a combined stream, including the first stream and the second stream, from the saltwater feed compartment to the water compartment through the membrane.

3. The system of claim 1, wherein the produced water from the DCMD-Abs section is collected in a tank disposed at an outlet of the DCMD-Abs section.

4. The system of claim 1, wherein the saltwater feed compartment of the DCMD-Abs section and the water compartment of the DCMD-Abs section define a DCMD-Abs module; and
   the system comprises from 5 to 25 DCMD-Abs modules.

5. The system of claim 1, wherein the system further comprises a saltwater pump to pump a portion of a saline water feed stream to both the condenser and the absorber.

6. The system of claim 5, wherein a mass flow rate of the saline water feed stream sent to the absorber is from 1.4 to 1.7 times greater than a mass flow rate of the saline water feed stream sent to the condenser.

7. The system of claim 1, wherein the heater for the first desorber is at least one selected from the group consisting of a space heater, heating pipes, a furnace, and a boiler.

8. The system of claim 1, wherein the membrane is at least one selected from the group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane.

9. The system of claim 1, wherein the first heat exchanger is at least one selected from the group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

10. The system of claim 1, wherein the second heat exchanger is at least one selected from the group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

11. The system of claim 4, wherein the DCMD-Abs modules are arranged in a counter-current configuration.

12. The system of claim 4, wherein the DCMD-Abs modules are arranged in a parallel/cross flow configuration.

13. The system of claim 1, wherein the system employs water as a refrigerant.

14. The system of claim 4, wherein the absorber is in fluid communication with a first module of the DCMD-Abs section through a first module inlet.

15. The system of claim 4, wherein the condenser is in fluid communication with the first module of the DCMD-Abs section through a first module inlet.

16. The system of claim 4, wherein a first module of the DCMD-Abs section is in fluid communication with a second module of the DCMD-Abs section and configured to pass a combined stream, including the first stream and the second stream, from a first module outlet to a second module inlet.

17. The system of claim 1, wherein a heat transfer fluid employed in both the first heat exchanger and the second heat exchanger is at least one molten salt selected from the group consisting of sodium nitrate and potassium nitrate.

18. The system of claim 2, wherein the saltwater feed compartment of the DCMD-Abs section includes a discharge line configured to remove excess brine within the saltwater feed compartment.

* * * * *